(12) United States Patent
Kawabe

(10) Patent No.: US 7,920,348 B2
(45) Date of Patent: Apr. 5, 2011

(54) MAGNETIC STORAGE MEDIUM AND MAGNETIC RECORDING DEVICE

(75) Inventor: Takayuki Kawabe, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 35 days.

(21) Appl. No.: 12/475,016

(22) Filed: May 29, 2009

(65) Prior Publication Data

US 2010/0033867 A1    Feb. 11, 2010

(30) Foreign Application Priority Data

Aug. 5, 2008 (JP) ................................. 2008-201737

(51) Int. Cl.
*G11B 5/09* (2006.01)
*G11B 21/02* (2006.01)

(52) U.S. Cl. ........................................... 360/48; 360/75

(58) Field of Classification Search .................. None
See application file for complete search history.

(56) References Cited

U.S. PATENT DOCUMENTS

| | | | |
|---|---|---|---|
| 7,643,234 B2 * | 1/2010 | Albrecht et al. | 360/48 |
| 2005/0094298 A1 * | 5/2005 | Sakurai et al. | 360/15 |
| 2006/0280974 A1 | 12/2006 | Okino et al. | |
| 2008/0212228 A1 * | 9/2008 | Shibano | 360/77.01 |
| 2009/0097160 A1 * | 4/2009 | Yamamoto | 360/135 |

FOREIGN PATENT DOCUMENTS

| | | |
|---|---|---|
| JP | A 2002-109712 | 4/2002 |
| JP | A 2003-109333 | 4/2003 |
| JP | A 2006-344328 | 12/2006 |

* cited by examiner

*Primary Examiner* — Andrew L Sniezek
(74) *Attorney, Agent, or Firm* — Greer, Burns & Crain, Ltd.

(57) ABSTRACT

A patterned media type magnetic storage medium has separated magnetic dots formed a data area having a first magnetic dots and a servo area. The micro position detection portion in the servo area is constructed with first and second dot arrays having a different number of second magnetic dots in the circumference direction and face with the center line that the first magnetic dots of the data area in the magnetic storage medium are disposed, as the axis. The area of the magnetic dot constituting the micro position detection portion of the servo area is small, so the coercive force of the servo area increases. The frequency is changed depending on the number of magnetic dots, and the phase is changed depending on the position of the magnetic dot array in the radius direction with the center line as an axis.

13 Claims, 22 Drawing Sheets

FIG.16

|  |  | Phs( 6T ) | |
|---|---|---|---|
|  |  | + | − |
| Phs( 8T ) | + | Mag( 8T )-Mag( 6T ) | Mag( 6T )-Mag( 8T ) |
|  | − | Mag( 6T )-Mag( 8T ) | Mag( 8T )-Mag( 6T ) |

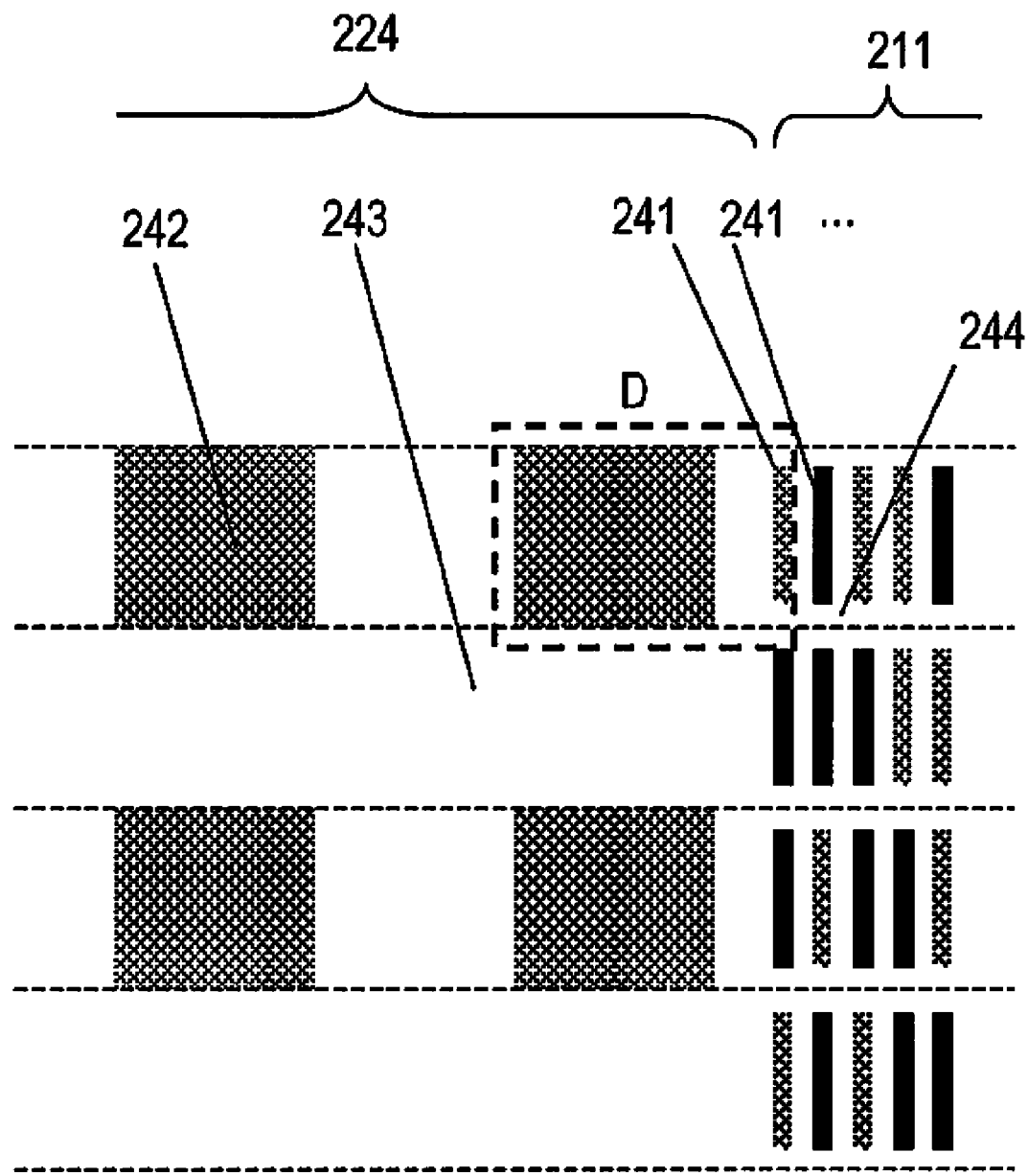

MAGNETIC STORAGE MEDIUM AND MAGNETIC RECORDING DEVICE

CROSS-REFERENCE TO RELATED APPLICATION

This application is based upon and claims the benefit of priority of the prior Japanese Patent Application No. 2008-201737, filed on Aug. 5, 2008, the entire contents of which are incorporated herein by reference.

FIELD

The present invention relates to a magnetic storage medium used for recording/reproducing information and a magnetic recording device which uses the magnetic storage medium, and more particularly to a magnetic storage medium having magnetic dots which is separated a magnetic recording material by a non-magnetic recording material, and a magnetic recording device which uses the magnetic storage medium.

DESCRIPTION OF THE RELATED ART

Recently a patterned media type magnetic storage medium is attracting attention as a technology to improve the recording capacity of magnetic recording devices. The patterned media type magnetic storage medium is a recording medium where uniform size micro-crystal grains having magnetism to record data are disposed on a substrate at predetermined positions, separated by non-magnetic material. In the patterned media type magnetic storage medium, an improvement of the surface recording density is theoretically possible (e.g. see Japanese Patent Application Laid-Open No. 2003-109333 and Japanese Patent Application Laid-Open No. 2002-109712).

In this disk type magnetic storage medium (magnetic disk medium), a pattern, including a magnetic substance for recording/reproducing information (data pattern) and a pattern for positioning the magnetic head with respect to the above-mentioned magnetic substance (servo-pattern), are formed on a substrate.

FIG. 22 is a diagram depicting a configuration of a data pattern and servo pattern of a conventional patterned media type magnetic storage medium, and FIG. 23 is an enlarged view of portion C in FIG. 22. In FIG. 22, the vertical direction is a radius direction of the disk, and the horizontal direction is a track (circumference) direction, and the dotted line in the horizontal direction indicates the track boundary.

As FIG. 22 shows, in patterned media, magnetic portions of the data area and magnetic dots of the servo area are formed at predetermined positions. In the data area 211, a plurality of magnetic dots (first magnetic dots) 241 (see FIG. 23) are disposed at predetermined positions. First magnetic dots 241, which adjoin in the circumference direction, are disposed with a predetermined interval. The first magnetic dots 241 are formed of ferro-magnetic poly-crystals, such as Co—Cr—Pt, Co—Cr—Pt—B, or Co—Cr—Pt—$SiO_2$. Around the first magnetic dot 241, a non-magnetic substance 244, such as silica, alumina or air exists. Two adjacent first magnetic dots 241 are separated by this non-magnetic substance 244.

In the magnetic disk device, a desired magnetic field is applied to the first magnetic dots 241 by a recording element respectively. By this magnetic field, magnetization of the first magnetic dots 241 is maintained in a desired direction. A reproducing element reproduces the magnetic information recorded in the first magnetic dots 241. In the case of a vertical magnetic recording type magnetic disk medium, magnetic dots are magnetized in a normal line direction on the surface of the medium.

The servo area 212, on the other hand, is classified into a synchronization signal generation portion 221, synchronization signal detection portion 222, address portion 223 and micro-position detection portion 224, depending on the function used for the magnetic disk medium, as shown in FIG. 22.

The synchronization signal generation portion 221 has a function to adjust the amplification factor of a signal amplifier to make the amplitude constant and a function to generate the sampling timing of the A/D converter (Analog to Digital converter) clock signal before reading the servo information. The synchronization signal generation portion 221 includes magnetic portions which are continuous in a radius direction in all or a part of the range from the inner circumference to outer circumference of the medium, and are disposed in the circumference direction with a predetermined interval.

The synchronization signal detection portion 222 is a characteristic pattern which indicates the start of the servo information. The synchronization signal detection portion 222 includes a single magnetic portion having a bit length longer than the synchronization signal generation portion, or a plurality of magnetic portions which are continuous in a radius direction in all or a part of the range from the inner circumference to the outer circumference of the medium, and which generate a predetermined code having a several bit length in the circumference direction.

The address portion 223 is an ID pattern which indicates a track number and sector number for each servo frame. The address portion 223 indicates a track position where the magnetic head positions in the magnetic recording device.

The address portion 223 includes magnetic substance which continues in the radius direction in all or a part of the range from the inner circumference to the outer circumference of the medium in a circumference direction position indicating a sector number, is continuous in a radius direction in all or a part of the range from the inner circumference to the outer circumference of the medium in a circumference position indicating higher digits of the track number, and is intermittent in a radius direction of the medium in a circumference direction position indicting lower digits of the track number.

The micro-position detection portion 224 is for detecting shift information of the magnetic head position from the track center in the magnetic recording device. The micro-position detection portion 224 has magnetic patterns having a specific form and array in the circumference direction, and each magnetic pattern is disposed with equal interval for each track in the radius direction of the medium.

FIG. 23 is an enlarged view of a portion C in FIG. 22, that is, an area near the boundary of the micro-position detection portion 224 and the data sector 211, out of the servo area 212. The servo area 224 includes second magnetic dots 242 for specifying a radius position of the first magnetic dot 241 included in the data area 211. The servo area 212 also includes a non-magnetic portion 243. As FIG. 22 shows, it is proposed that the micro-position detection portion 224 detects a position by area demodulation, so two magnetic dots 242 are alternately disposed with the track boundary (horizontal dotted line in FIG. 22) in the circumference direction (e.g. see Japanese Patent Application Laid-Open No. 2006-344328).

In the case of the area demodulation method, the position of the reproducing head is demodulated by magnitude and the polarity of output of the reproducing head, which is in proportion to the magnetic field acquired based on the magnetic dots 242 alternately disposed in the circumference direction. Because of this, the second magnetic dots 242 having a larger area than the area of the first magnetic dots 241 in the data area 211 are formed in the micro-position detection portion 224 according to a prior art.

The second magnetic dots of the micro-position detection portion normally generate magnetization in a single direction, which is required for specifying the servo information, by applying a strong magnetic field onto the entire medium before using the magnetic storage medium. However in the micro position detection portion, the second magnetic dots, which have a larger area than the first magnetic dots in the data area, have a low coercive force, and therefore even if an external magnetic field which can magnetize all the secondary dots in a single direction is applied, magnetization is partially reversed, which makes it difficult to maintain a stable servo pattern.

SUMMARY

With the foregoing in view, it is an object of the present invention to provide a magnetic storage medium and magnetic recording device for accurately detecting a position by a reproducing signal of the micro-position detection portion of a reproducing element, even if the micro position detection portion is formed of magnetic dots.

It is another object of the present invention to provide a magnetic storage medium and magnetic recording device for obtaining stable reproducing signals, even if the micro position detection portion is formed of magnetic dots.

It is still another object of the present invention to provide a magnetic storage medium and magnetic recording device for preventing a drop in magnetization coercive force, even if the micro position detection portion is formed of magnetic dots.

To achieve the above described objects, a magnetic storage medium, including: a data area having a track in which a plurality of isolated first magnetic dots are disposed at predetermined positions for recording information; and a servo area for specifying a position of the first magnetic dot, wherein the servo area has a micro position detection portion where a first magnetic dot array in which a first number of isolated second magnetic dots are arrayed in a first interval, and a second magnetic dot array in which a different number of second magnetic dots from that of the second magnetic dots in the first magnetic dot array are arrayed in a second interval, are disposed in positions facing each other with the center line of the track in which the first magnetic dots are disposed as an axis.

A magnetic recording device, including: a magnetic storage medium comprising a data area having a track in which a plurality of isolated first magnetic dots are disposed at predetermined positions for recording information, and a servo area which specifies a position of the first magnetic dot, and has a micro position detection portion where a first magnetic dot array in which a first number of isolated second magnetic dots are arrayed in a first interval, and a second magnetic dot array in which a different number of second magnetic dots from that of the second magnetic dots in the first magnetic dot array are arrayed in a second interval, are disposed in positions facing each other with the center line of the track in which the first magnetic dots are disposed as an axis; a magnetic head which records magnetic information to the magnetic storage medium or reproduces magnetic information on the magnetic storage medium; and a control circuit which extracts the amplitude and phase of two different types of cyclic components from a magnetic reproducing signal of the micro position detection portion of the servo area, detected by the magnetic head, and detects the position of the magnetic head with respect to the first magnetic dot.

Also, it is preferable that the magnetic storage medium is a disk type, and the servo area is disposed intermittently on a strip of circumference of which center is the center of the magnetic storage medium, and the data area is disposed in a portion on the strip of circumference, where the servo area is not disposed.

Also, it is preferable that the first magnetic dot array has a non-magnetic area in which the first number of the second magnetic dots are disposed continuously and of which length is a length of the first number of second magnetic dots, and the second magnetic dot array has a non-magnetic area in which the second number of the second magnetic dots are disposed continuously and of which length is a length of the second number of second magnetic dots.

Also, it is preferable that the first magnetic dot array and the second magnetic dot array are disposed at positions shifted in the circumference direction of the magnetic storage medium.

Also, it is preferable that the second magnetic dot has an area which does not exceed an area of the first magnetic dot.

Also, it is preferable that the first magnetic dot and the second magnetic dot are formed of a poly-crystal magnetic material.

Also, it is preferable that the first magnetic dot and the second magnetic dot are formed of the same material.

It is preferable that the second magnetic dot in the first magnetic dot array is linked with the second magnetic dot in the second magnetic dot array, which exists at a same position in the radius direction of the magnetic storage medium.

Since the micro position detection portion is constructed with a different number of magnetic dots in the circumference direction with the center line, where the magnetic dots of the data area are disposed, as the axis, the position can be demodulated accurately from the reproducing signal, even if the area of the magnetic dot of the micro-position detection portion is small. Also because the area of the magnetic dot constituting the micro position detection portion of the servo area is small, the coercive force of the servo area increases, which is excellent in terms of reliability of the reproducing signal of the servo area, and can improve reliability of recording/reproducing of the data area. Since the frequency is changed depending on the number of magnetic dots, and the phase is changed depending on the position of the magnetic dot array in the radius direction with the center line as an axis, the shift amount of the head position can be easily demodulated from the reproducing signal of the head.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 16 is a diagram depicting the demodulated logic of FIG. 10;

FIG. 23 is an enlarged view of portion in FIG. 22.

DESCRIPTION OF THE PREFERRED EMBODIMENTS

Embodiments of the present invention will now be described in the sequence of magnetic recording device, first embodiment of a magnetic storage medium, servo pattern demodulation circuit, second embodiment of a magnetic storage medium, third embodiment of a magnetic storage medium, manufacturing method for a magnetic storage medium, and other embodiments, but the present invention is not limited to these embodiments.

(Magnetic Recording Device)

Figure 1:
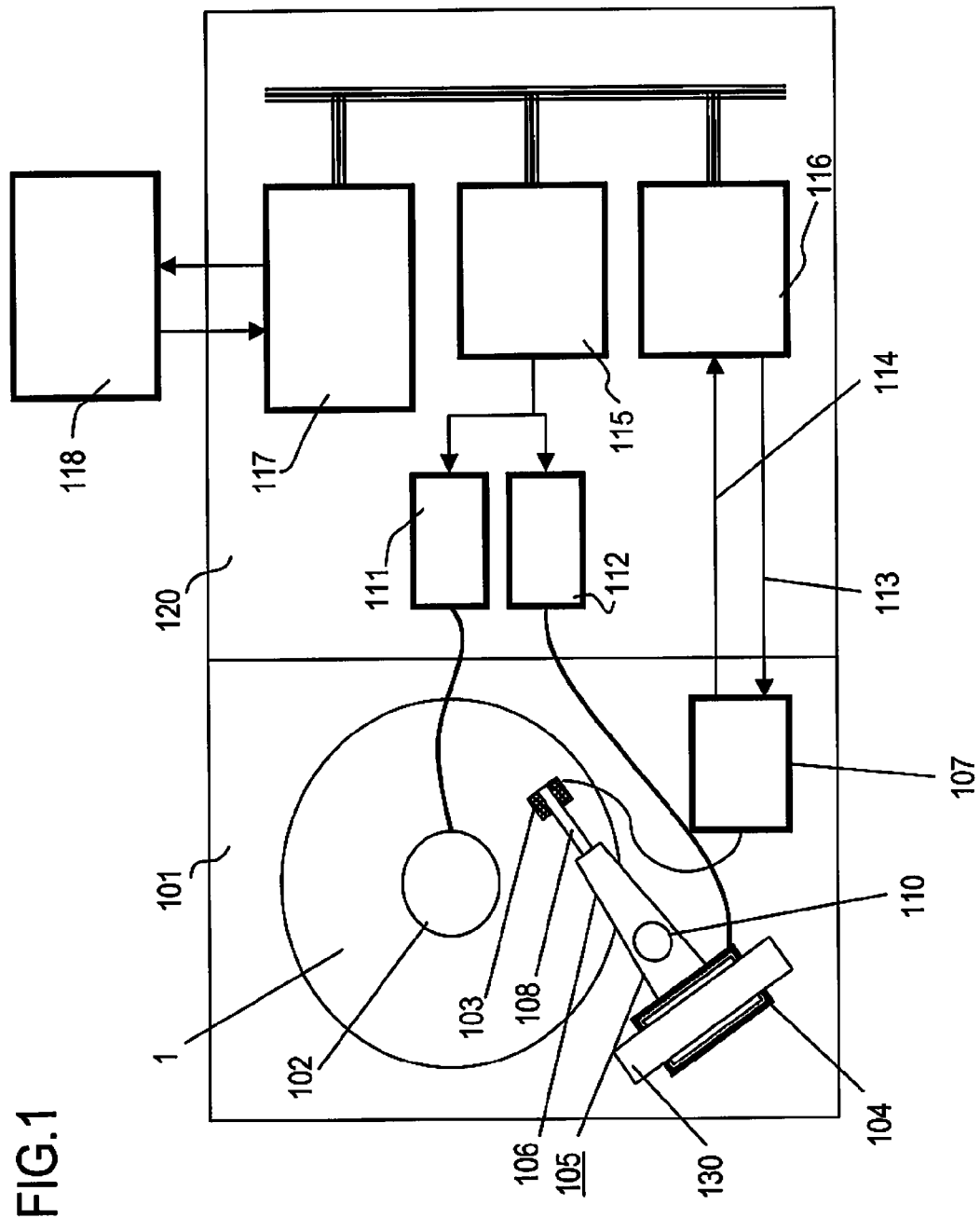
FIG. 1 is a block diagram depicting an embodiment of a magnetic recording device having a magnetic storage medium.

FIG. 1 is a block diagram depicting an embodiment of a magnetic recording device having a later mentioned magnetic storage medium. The magnetic recording device shown in FIG. 1 has a disk type magnetic storage medium (magnetic disk medium) 1. Hereafter a magnetic recording device having a magnetic disk medium is called a "magnetic disk device".

The magnetic disk device has a disk enclosure 101 and a circuit board 120.

The disk enclosure 101 is a container which encloses the magnetic disk medium 1, a spindle motor 102, a magnetic head 103, an actuator 105 and a head amplifier 107.

The actuator 105 is comprised of a yoke 130, a voice coil motor (VCM) 104, a head gimbals assembly 108, a carriage arm 106 and a shaft 110, and is used for positioning the magnetic head 103 to an arbitrary radius position of the magnetic disk medium 1. The magnetic disk medium 1 is installed in the spindle motor (SPM) 102.

The magnetic head 103 includes at least one of a recording (write) element which records magnetic information on the magnetic disk medium 1 (not illustrated), and a reproducing (read) element which reads the magnetic information recorded in the magnetic disk medium 1 as electric signals (not illustrated).

The recording element includes a write coil, a main magnetic pole layer and an auxiliary pole layer. The write coil has a function to generate magnetic flux. The main magnetic pole layer has a function to store the magnetic flux generated in the write coil, and releases the magnetic flux to the magnetic disk. The auxiliary magnetic pole layer has a function to circulate the magnetic flux released from the magnetic pole layer via the magnetic disk.

An example of the reproducing element is an MR element (magneto-resistance effective element). The magnetic head 103 is mounted in the head gimbals assembly 108, and disposed so as to face the magnetic disk medium 1. For the magnetic medium 1, the later mentioned various magnetic storage media can be used.

The end of the head gimbals assembly 108 where the magnetic head 103 is not mounted is fixed at the tip of the carriage arm 106. The carriage arm 106 can be driven to swing by the yoke 130 and VCM 104 with the shaft 110 as the rotation axis.

By this swing driving, the magnetic head 103 can scan the magnetic disk 1 roughly in the diameter direction. When the magnetic head 103 is positioned on a desired recording track on the magnetic disk medium 1, the magnetic head 103 can write information to the recording bits arrayed on the recording tracks on the magnetic disk medium 1, or read information from the magnetic disk medium 1.

The head amplifier 107 has a function to supply current to the recording element mounted on the magnetic head 103 based on the recording signal 113, and record the data on the magnetic disk medium 1, or to convert the magnetization information on the magnetic disk medium 1 detected by the reproducing element of the magnetic head 103 into reproducing signals 114.

The circuit board 120 includes a read channel 116, a micro processing unit (MPU) 115, a spindle motor (SPM) driver 111, a voice coil motor (VCM) driver 112 and a disk controller 117.

The read channel 116 has a function to decode the reproducing signals 114 from the head amplifier 107 (servo signals or data signals), and convert them into digital information, or to convert information of which recording is instructed by the disk controller 117 into recording signals 113 for driving the head amplifier 107.

The MPU 115 controls the VCM driver 112 to perform positioning control of the magnetic head 103, or controls the SPM driver 111 to perform rotation control of the magnetic disk medium 1, based on the digital information of the servo signal (servo information) decoded by the read channel 116.

The disk controller 117 has a function to instruct the MPU 115 to position the magnetic head 103 for addressing to the magnetic disk medium 1 of the magnetic head 103, by analyzing the recording/reproducing command from the host computer 118. The disk controller 117 also has a function to transmit/receive digital information to be recorded and reproduced to/from the read channel 116, and replies the result to the host computer 118.

Figure 2:
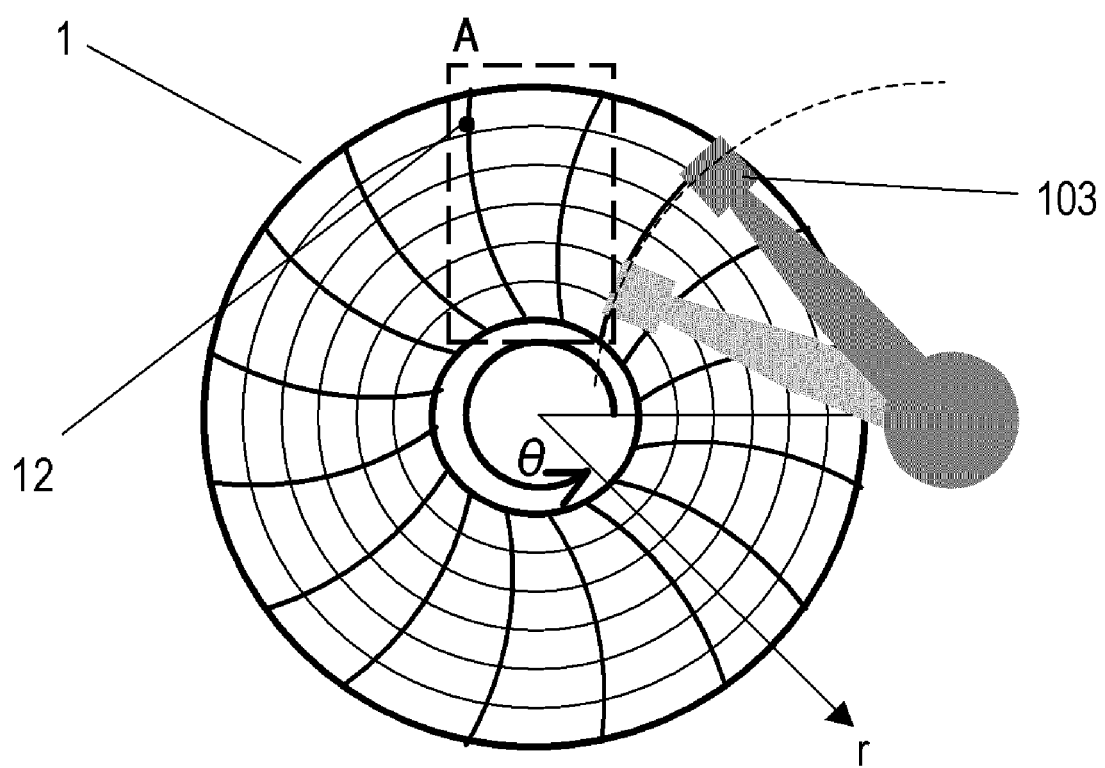
FIG. 2 is an explanatory diagram depicting a servo area of magnetic disk in FIG. 1.
Figure 3:
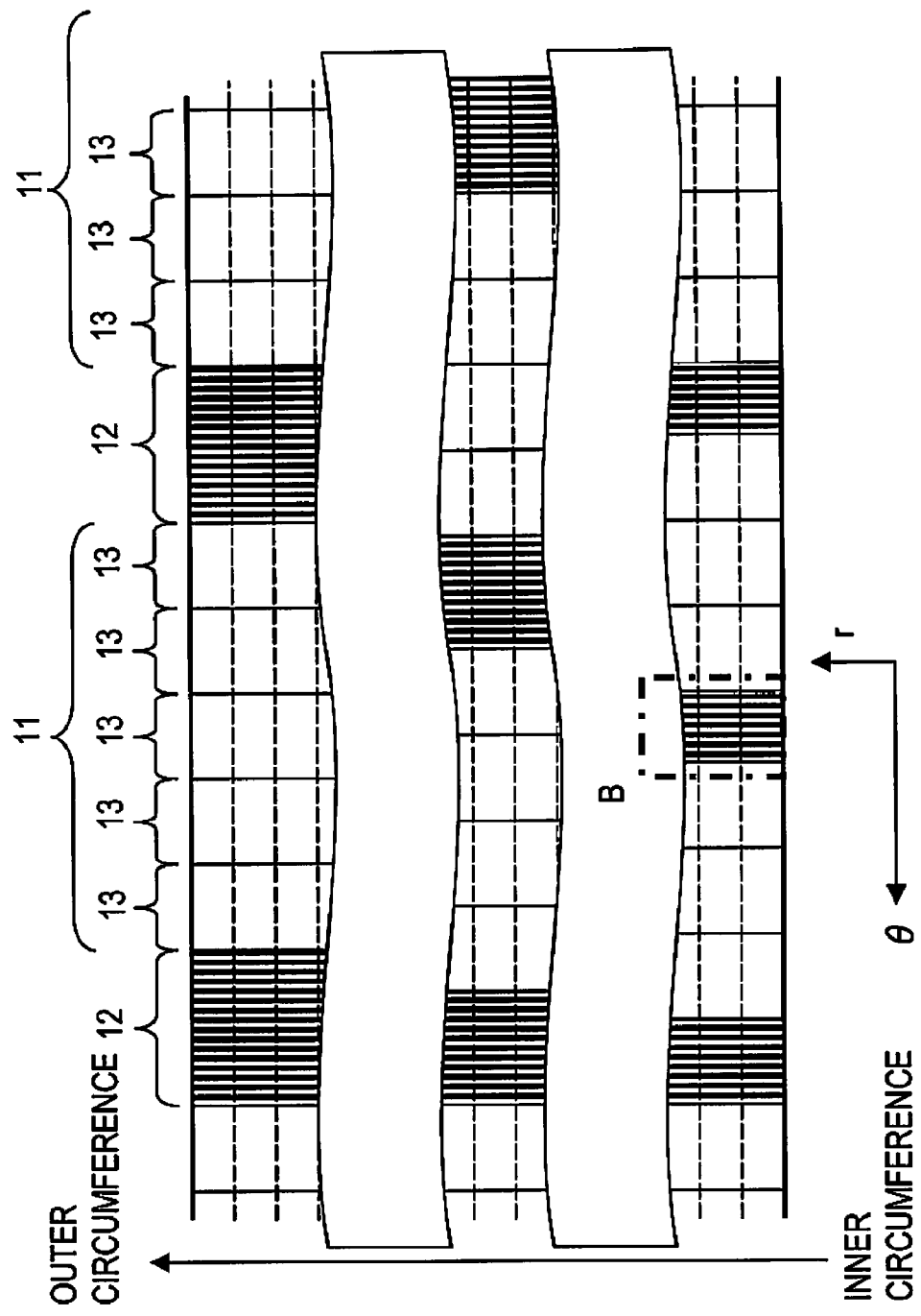
FIG. 3 is an explanatory diagram depicting the servo area and the data area in FIG. 2.

The magnetic disk 1 will now be described. FIG. 2 is a plan view depicting a sector structure of a magnetic disk medium according to an embodiment, installed in the magnetic disk device. FIG. 3 is an enlarged view of portion A in FIG. 2. In the drawings, the θ axis is the circumference direction of the disk, and the r axis is the diameter direction on the disk surface.

As FIG. 3 shows, the data area 11 and the servo area 12 are alternately disposed on the magnetic disk 1 in the circumference direction. As FIG. 2 shows, the servo area 12 is intermittently disposed roughly on a strip of circumference with the center area of the magnetic disk area 1 as the center. The data area 11 is disposed roughly on a strip of circumference where the servo area 12 is not disposed.

As FIG. 3 shows, the data area 11 is an area for storing data. In the data area 11, data sectors 13, which are storage areas for recording and reproducing, are disposed in a predetermined length in the circumference direction. Each data sector 11 includes magnetic dots, as described with reference to FIG. 6 and later drawings. The shapes and arrangements of the magnetic portions disposed in the data area 11 is called a "data pattern".

The servo area (servo sector) 12 is disposed to specify a position of magnetic dots included in the data area 11 (particularly the position of the disk in the radius direction). The servo area 12 includes magnetic dots with various shapes in various arrangements as described later. As FIG. 2 shows, the shape of the servo area 12 is an arc to be the head access locus of the magnetic disk device, and the length of the servo area 12 in the circumference direction increases in proportion to the distance in the radius direction (see FIG. 3). The shape and arrangement of the magnetic dots disposed in the servo area 12 is called a "servo pattern".

The magnetic head 103 acquires the position information of the magnetic head 103 by reading the reproducing signals generated by the magnetic dots included in the servo area 12 in a state of rotating the magnetic disk medium 1.

Based on the acquired position information of the magnetic head 103, the magnetic head 103 is positioned with respect to the track, and can record and reproduce data to/from the magnetic portion at a desired position of the data area 12.

As mentioned above, the servo area 12 is comprised of a synchronization signal generation portion, synchronization signal detection portion, address portion and micro position detection portion 24. The synchronization signal generation portion has a function to adjust the amplification factor of the signal amplifier to make the amplitude constant, and to generate a sampling timing of the A/D converter (Analog to Digital converter) clock signal before reading the servo information. The synchronization signal generation portion includes magnetic portions which are continuous in all or a part of the range from the inner circumference to the outer circumference of the medium in the diameter direction, and are dispersed with a predetermined interval in the circumference direction.

The synchronization signal detection portion has a characteristic pattern which indicates the start of the servo information. The synchronization signal detection portion includes a single magnetic portion having a bit length longer than the synchronization signal generation portion, or a several bit long predetermined code in the circumference direction which are continuous in all or a part of the area from the inner circumference to the outer circumference of the medium in the radius direction.

The address portion is an ID pattern which indicates a track number and sector number for each servo frame. In the magnetic recording device, the address portion indicates a track position where the magnetic head positions. The address portion includes a first magnetic substance, which is continuous in all or a part of the area from the inner circumference to the outer circumference of the medium in the radius direction in a circumference direction position indicating the sector number, a second magnetic substance which is continuous in all or a part of a range from the inner circumference to the outer circumference of the medium in the radius direction in a circumference direction position indicating the higher digits of the track number, and a third magnetic substance which is intermittent in the radius direction of the medium in the circumference direction position indicating the lower digits of the track number.

The micro position detection portion 24 is disposed for detecting the shift information of the magnetic head position from the track center. The micro position detection unit 224 has magnetic patterns having a specific shape and array in the circumference direction, and each magnetic pattern is disposed with an equal interval for each track in the diameter direction of the medium.

First Embodiment of a Magnetic Storage Medium

Figure 4:
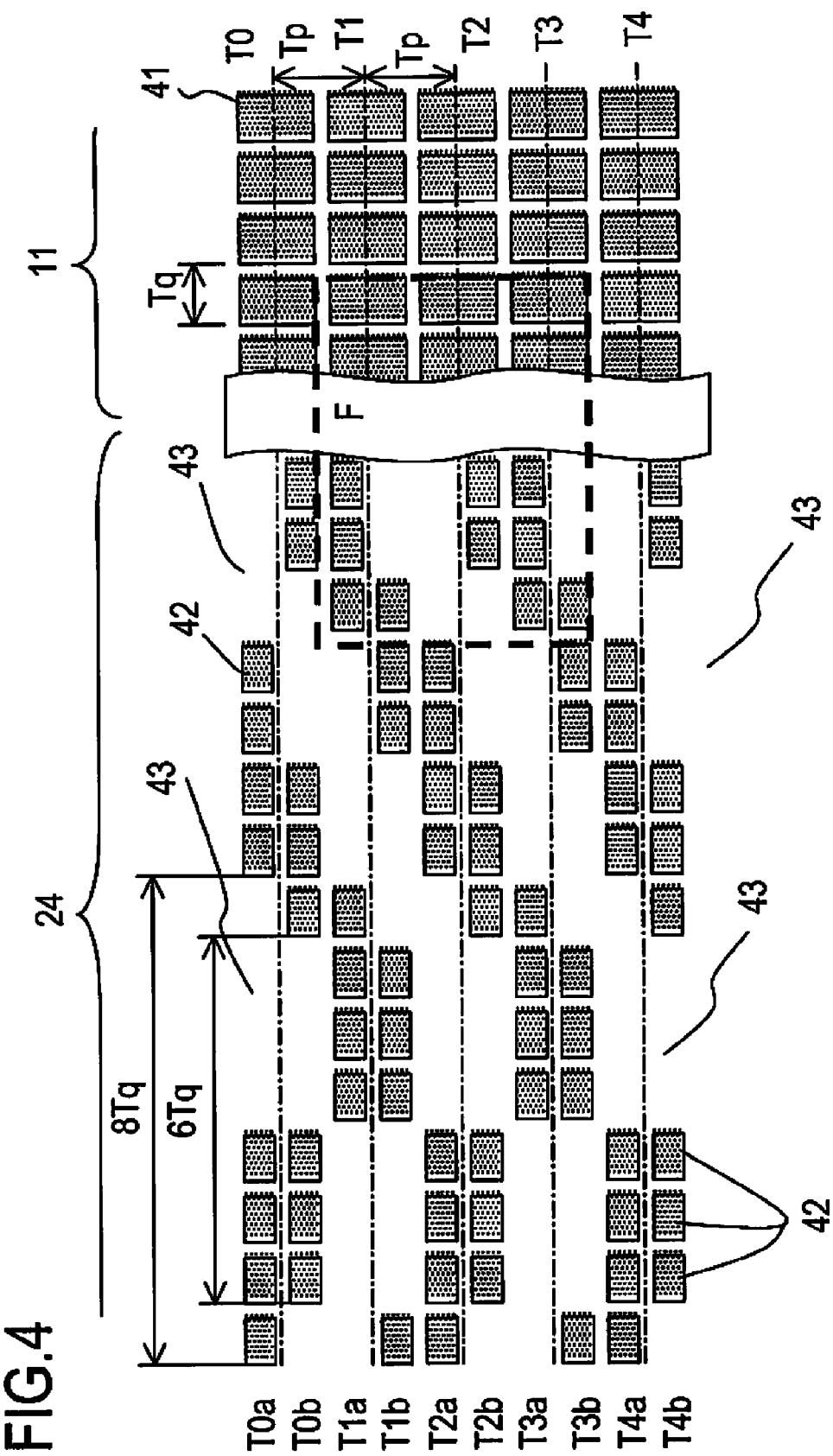
FIG. 4 is a diagram depicting a configuration of a magnetic storage medium according to a first embodiment of the present invention.
Figure 5:
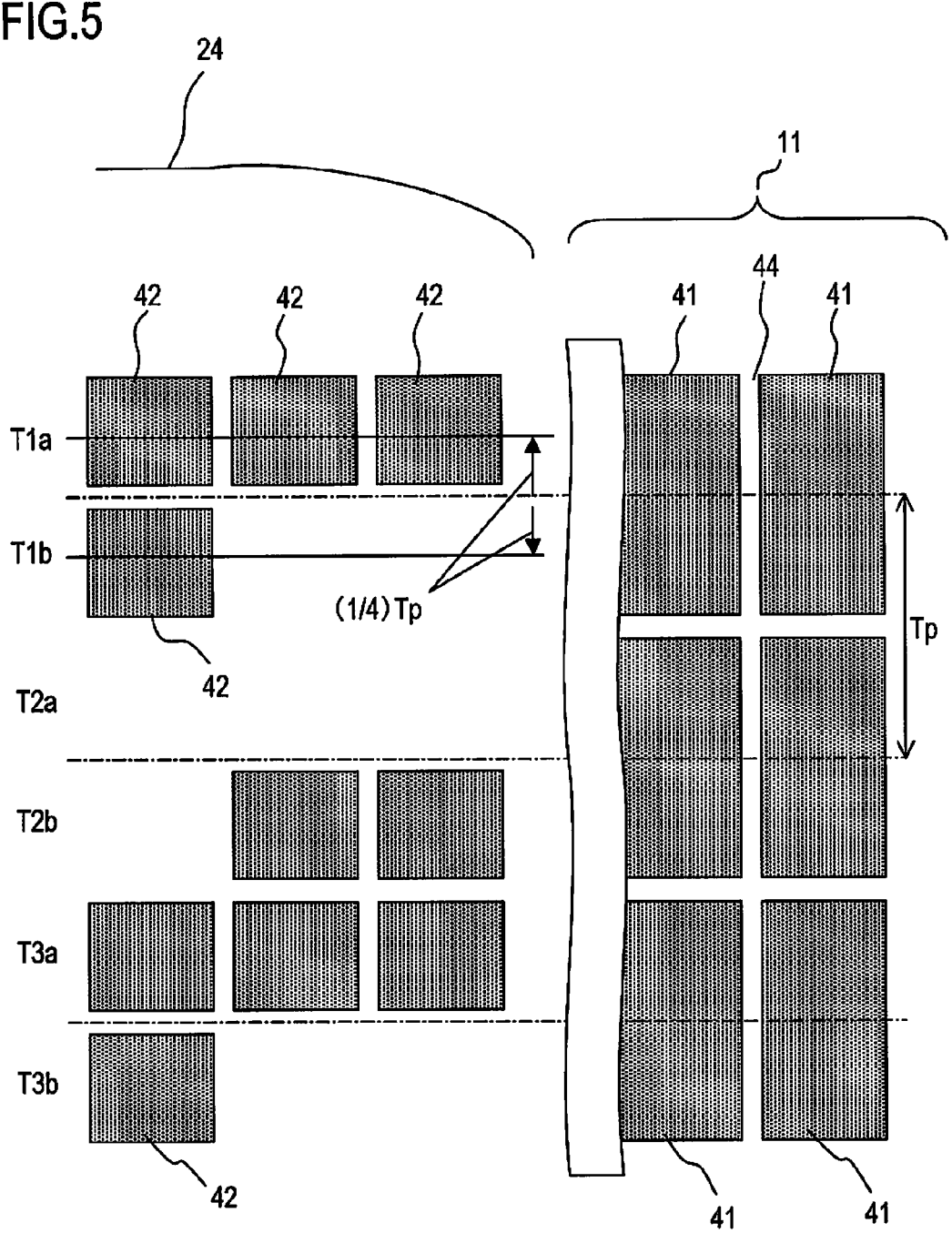
FIG. 5 is an enlarged view of a portion in FIG. 4.

FIG. 4 is a diagram depicting a configuration of a magnetic storage medium according to a first embodiment of the present invention, and FIG. 5 is an enlarged view of the portion F enclosed by the broken line in FIG. 4. FIG. 4 and FIG. 5 show only the micro position detection portion 24 and the data portion 11.

As FIG. 4 and FIG. 5 show, in the data area 11, a first magnetic dot 41 is disposed evenly in the circumference direction and radius direction of the magnetic disk medium 1. The interval thereof is Tq in the circumference direction, and Tp in the radius direction. The dash and dotted line in FIG. 4 and FIG. 5 show a respective center line of a recording track T0, T1, . . . T4, which is a row of the first magnetic dots 41 in the circumference direction.

The first magnetic dot 41 is formed of ferro-magnetic polycrystals, such as Co—Cr—Pt. Around the first magnetic dot 41, non-magnetic substance 44, such as silica, alumina and air, is disposed. Two adjacent first magnetic dots 41 are separated by this non-magnetic substance 44. Now the micro position detection portion 24 of the servo area 12 will be described. In the micro position detection portion 24, a second magnetic dot 42 is disposed on a parallel line, which is away from the center line of the recording track (dash and dotted line) by (¼) Tp, in the circumference direction of the magnetic disk medium 1, repeatedly according to a predetermined pattern.

The predetermined pattern in this case means a pattern of which one cycle is a predetermined number of the second magnetic dots 42 followed by the same length of non-magnetic portion 43.

For example, in FIG. 4, repeat patterns with an 8 Tq cycle and 6 Tq cycle are disposed on parallel lines T0a and T0b, which are away from the center line of the recording track T0 by (¼) Tp respectively in the radius direction.

The repeat patterns with an 8 Tq cycle and 6 Tq cycle are also disposed on parallel lines T1a and T1b, which are away from the center line of the recording track T1, which is adjacent to the recording track T0, by (¼) Tp respectively in the radius direction.

However in the pattern disposed on the recording track T1, the relationship of the second magnetic dot 42 and the non-magnetic portion 43 at a same rotation angle is reversed, compared with the pattern disposed on the recording track T0.

In other words, four patterns having two cycles and two phases, that is +8Tq, +6Tq, −8Tq and −6Tq are disposed every two recording tracks. When the reproducing element of the magnetic head 103 for reproducing the information recorded in the first magnetic dot 41 passes through the micro position detection portion 24 of the servo area 12, a signal containing components corresponding to the cycles and phases of at least two patterns, out of four patterns, is detected.

The second magnetic dot 42 is a square. The shape of the second magnetic dot 42, however, is not specifically limited to this, but can be one of various shapes, such as a circle, ellipse and polygon, according to necessity.

The second magnetic dot 42 is formed of ferro-magnetic poly-crystals, such as Co—Cr—Pt. Around the second magnetic dot 42, non-magnetic substance 43 formed of a non-magnetic material, such as silica, alumina and air, is disposed.

In the magnetic storage medium of the present embodiment, the area of the second magnetic dot 42 is the same or smaller than the area of the first magnetic dot 41. The following functions can be implemented if the relationship of the first magnetic dot 41 and the second magnetic dot 42 is as mentioned above.

Figure 6:
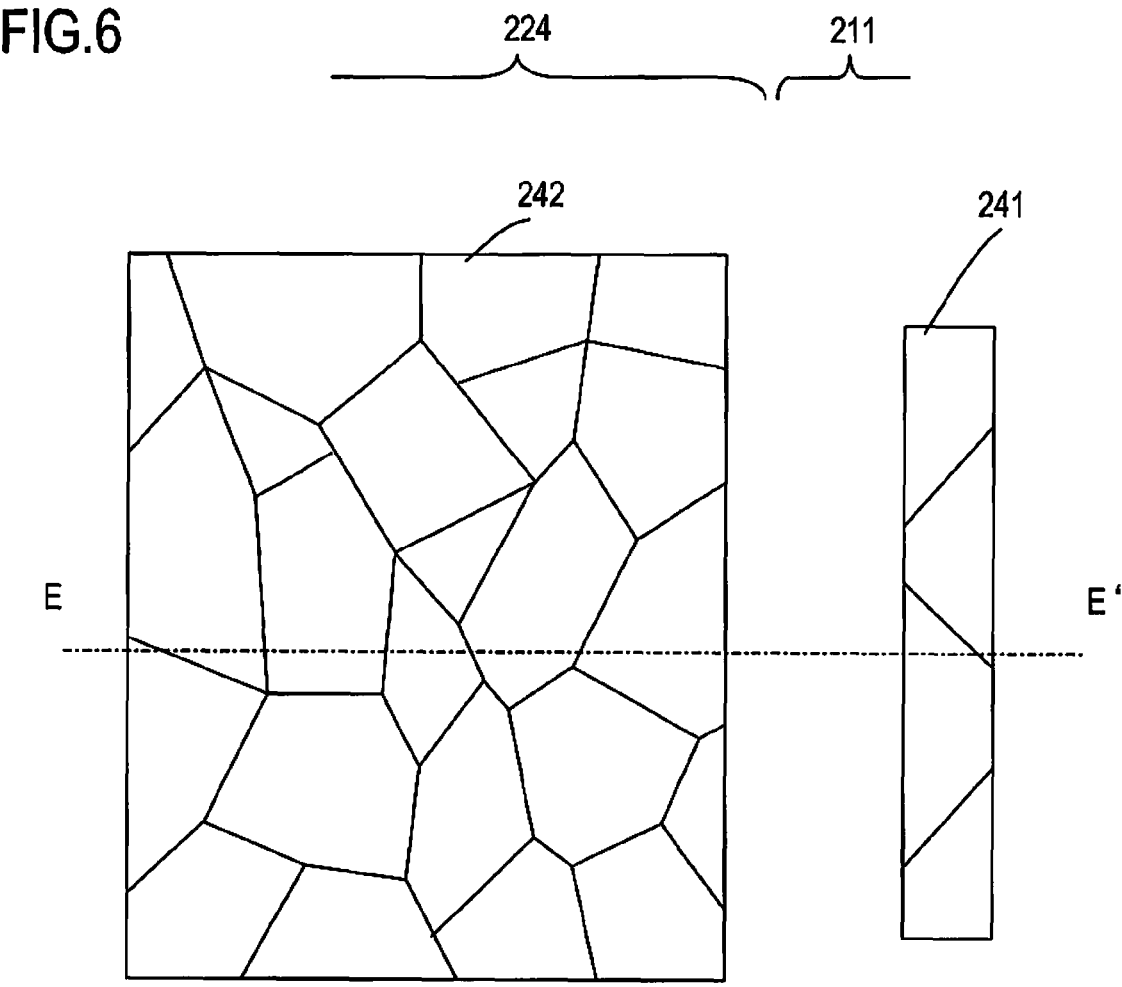
FIG. 6 is an explanatory diagram depicting the conventional second magnetic dots, to explain the efficiency of the second magnetic dot row in FIG. 4.

FIG. 6 is an enlarged view of magnetic dots of a conventional micro position detection unit and data portion. In FIG. 6, the first magnetic dot 241 and the second magnetic dot 242, which are adjacent to each other in the circumference direction in a same radius position, are shown.

Figure 7:
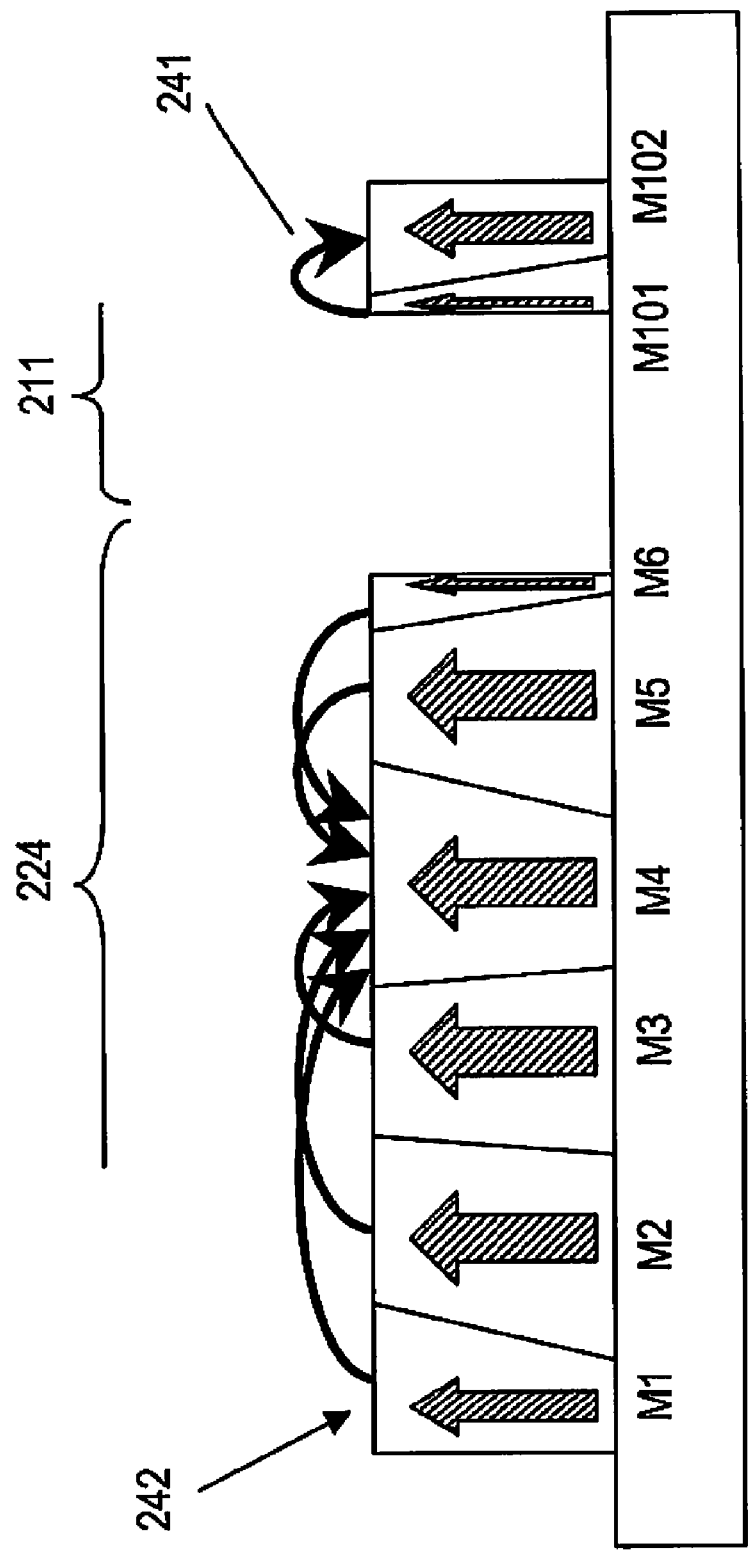
FIG. 7 is an explanatory diagram depicting the coercive force of the conventional second magnetic dots, to explain the efficiency of the second magnetic dot row in FIG. 4.

As FIG. 6 shows, each magnetic dot 241 and 242 is formed of a poly-crystal magnetic particles. FIG. 7 is a cross-sectional view sectioned in the E-E' direction in FIG. 6. A characteristic of the patterned media type magnetic storage medium is that all the magnetic particles in one magnetic dot face a same direction, that is, have a single magnetic domain structure.

In FIG. 7, in the case of a magnetic field which is applied to the magnetic particle M4 in the second magnetic dot 242, which has a large area, it is difficult for the magnetic particle M4 to maintain its own magnetization state because of the influence of the reverse magnetic field applied from the neighboring magnetic particles M1, M2, M3, M5 and M6, in addition to the reverse magnetic field from the magnetic particle M4 itself (not illustrated). In other words, the coercive force decreases.

On the other hand, in the case of the magnetic field applied to the magnetic particle M102 in the first magnetic dot 241, the magnetic particle M102 is influenced only by the reverse magnetic field from the magnetic particle M101, in addition to the reverse magnetic field applied by the magnetic particle M102 itself (not illustrated). In other words, the coercive force is high.

In this way, it became clear that the coercive force tends to decrease as the area of the magnetic dot increases. In other words, in the patterned media type magnetic disk, magnetization tends to reverse in a magnetic substance formed of poly-crystals having a large area, such as the magnetic portion of the servo pattern. That is, the coercive force thereof is low. This magnetization of the magnetic substance cannot be maintained stably with respect to the external magnetic field. Therefore reliability of the reproducing signals is affected.

In the second magnetic dot, magnetization in a single direction, which is required for specifying the servo information, is generated normally by applying a strong magnetic field on the entire magnetic storage medium before using the medium. However, in the case of the second magnetic dot, of which area is large compared with the first magnetic dot, as seen in the micro position detection portion, the coercive force is low, so even if an external magnetic field which can magnetize all the second magnetic dots in a single direction is applied, magnetization becomes partially reversed, and maintaining a stable servo pattern is difficult.

In order to implement a magnetic storage medium in which reliability of reproducing signals in the servo area is high, the present inventors paid attention to the area ratio of the magnetic dot in the servo area and the magnetic dot in the data area in conventional patterned media.

In a general magnetic disk device, the magnetic disk medium 1 is rotated such that the rotation angular speed becomes constant. The magnetic disk medium 1 which rotates like this is designed so that the information volume to be recorded in one circle of the servo area 12 becomes the same in the inner circumference area and outer circumference area.

Therefore in the servo area 12, the length of the magnetic dot constituting one bit of servo information in the circumference direction is long in the outer circumference area of the disk 1, and short in the inner circumference area of the disk 1. Whereas the length of the one bit of data information in the circumference direction in the data sector 13 constituting the data area 11 is roughly the same in the inner circumference area and the outer circumference area of the disk 1, so that the recording density of the data on a plane becomes roughly constant.

Therefore, particularly in the outer circumference area of the disk 1, the difference of the length in the circumference direction between the magnetic dot of the servo area and the magnetic dot of the data area becomes conspicuous.

The data area 12 has an independent magnetic dots 41 which are disposed intermittently in the circumference direction and radius direction of the disk 1. The servo area 12, particularly the synchronization signal generation portion, has continuous magnetic dots in the radius direction of the disk. Therefore the difference of the lengths in the diameter direction between the magnetic dots of the servo area and the magnetic dots of the data area greatly influences the ratio of the respective areas.

For example, when a 133 Gbpsi (133 gigabit per 1 inch square) class 2.5 inch magnetic disk medium is designed so that the track density becomes 140 kTPI (140000 tracks per inch) and the bit density is 950 kBPI (950 kilobits per inch), the size of the data sector is a 181 nm track width and a 26.7 nm bit length.

To drive this magnetic disk medium with a 5400 rpm rotation frequency, the linear velocity at a position of a 14 mm radius, which is about the innermost circumference of the disk 1, is 7.9 m/s. The servo frequency is a frequency when the servo pattern reproducing signals obtained from the reproducing head are sampled by A/D conversion.

When the servo frequency is 140 MHz (140 mega samples per second) and the 1 bit length consists of two samples, then the 1 bit length of the servo pattern is 113 nm, which is about five times the length of a data bit. This relationship doubles in the outer circumference of the disk.

In the present embodiment, the area of the second magnetic dot 42 of the micro position detection portion 24 is smaller than that of the first magnetic dot 41 of the data portion, thereby once magnetized in a single direction, the direction of magnetization of the magnetic dots does not easily change. Therefore this magnetic storage medium excels in terms of reliability of the reproducing signal of the servo area.

In terms of convenience of the process, it is preferable that the first magnetic dot 41 and second magnetic dot 42 are formed of a same material in a same process. In this case, if a magnetic material having a high coercive force is selected for the second magnetic dot 42, the first magnetic dot 41 is also formed of the magnetic material having a high coercive force.

If the coercive force of the first magnetic dot 41 is too high, then the magnetic head may not be able to record information to the magnetic dots 41 of the data area. According to the magnetic storage medium of the present embodiment, this problem is not generated, so the present invention excels in terms of reliability of recording/reproducing of the data area.

Figure 8:
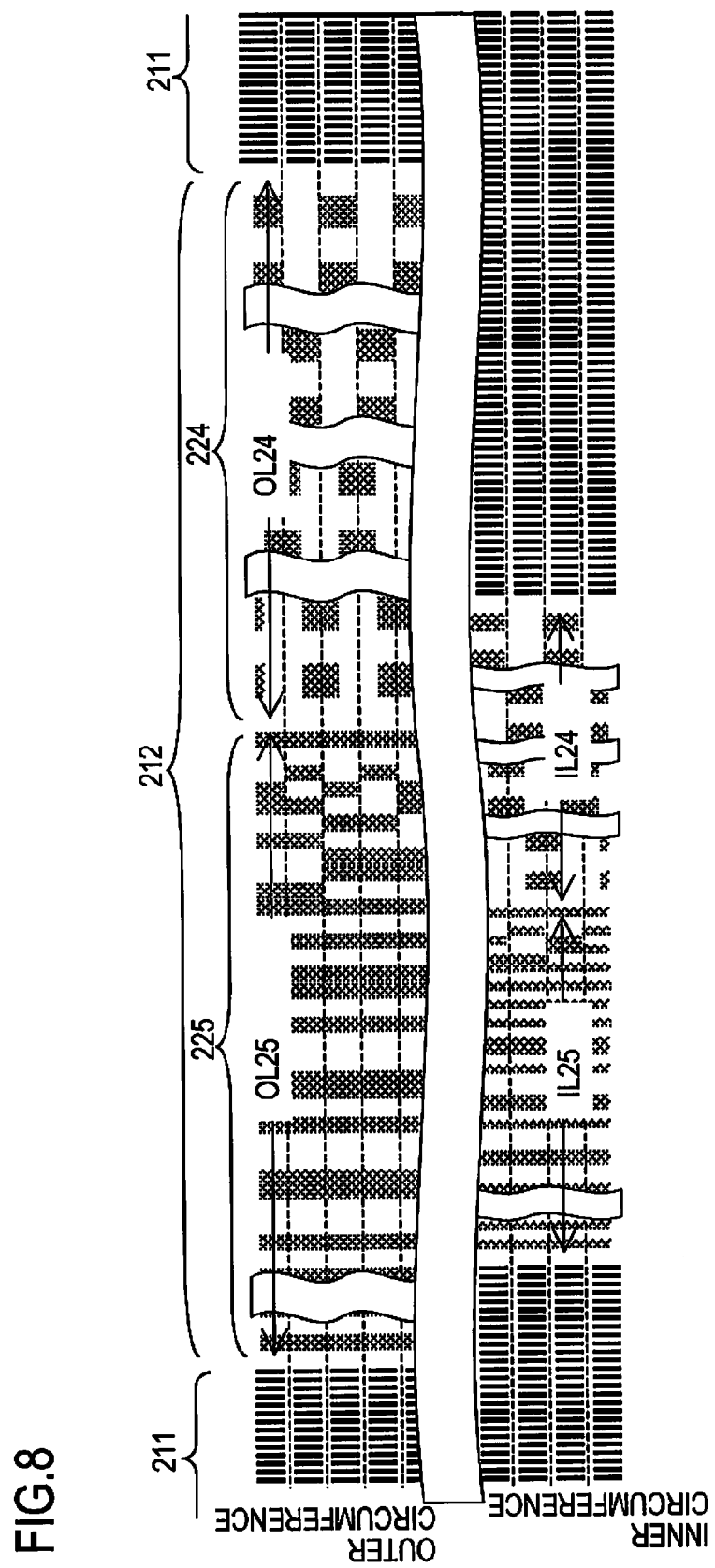
FIG. 8 is an explanatory diagram depicting the position of the conventional second magnetic dots, to explain the efficiency of the second magnetic dot row in FIG. 4.

The present embodiment also has an effect whereby the data area expands. FIG. 8 shows an area around one servo sector in a conventional magnetic disk medium, where the up direction leads to the outer circumference, and the down direction leads to the inner circumference of the medium.

The servo area 212 is separated into the micro position detection unit 224 and the other area 225. The lengths in the circumference direction, OL24 and OL25 of each area in the outer circumference of the medium, and the lengths in the circumference direction, IL24 and IL25 of each area in the inner circumference of the medium, are in the relationship of OL24/OL25=IL24/IL25. If the radius of the medium in the outer circumference is RO and the radius of the medium in the inner circumference is RI, then the relationship of OL24/IL24=OL25/IL25=RO/RI is established.

Figure 9:
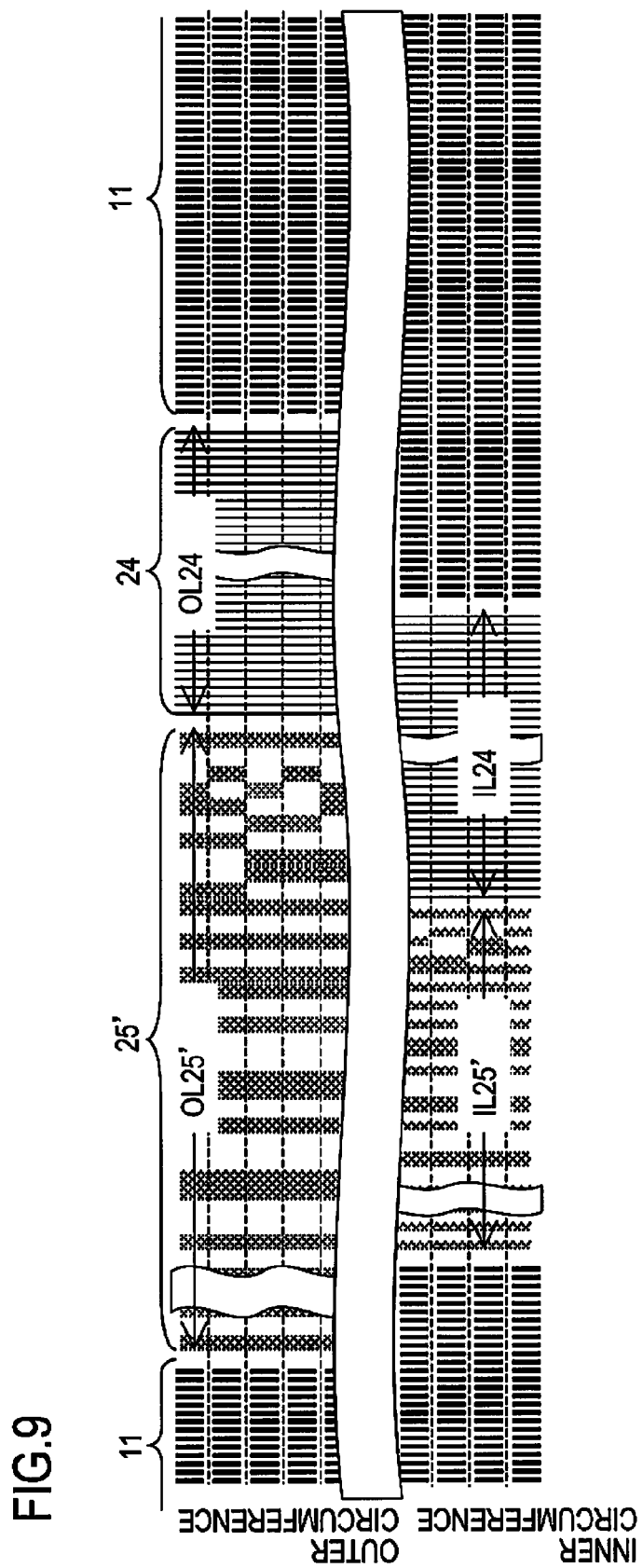
FIG. 9 is an explanatory diagram of the length of the servo area on the second magnetic dot row in FIG. 4.

FIG. 9 shows an area around one servo sector in the magnetic disk medium according to the present embodiment, where the up direction leads to the outer circumference of the medium, and the down direction leads to the inner circumference of the medium.

The lengths in the area 25', other than the micro position detection portion 24 of the servo area in the outer circumference and inner circumference according to the present embodiment, are in the relationship of OL25'/IL25'=RO/RI, just like the prior art. However in the micro position detection portion 24, the lengths in the outer circumference and inner circumference are in the relationship of OL24=IL24=1. In other words, the lengths in the circumference direction in the micro position detection portion of the servo area are constant, regardless the position in the radius direction of the medium.

In this way, the micro position detection portion 24 of the servo area according to the present embodiment has a same line density as the data area 11, so the length in the circumference direction can be decreased compared with the conventional micro position detection portion 224 of the servo area. In the outer circumference of the medium as well, the length in the circumference direction is the same as that in the inner circumference of the medium, so the area occupied by the servo area in the entire surface of the medium can be decreased, and the data area can be expanded. As a result, a storage capacity per medium can be increased.

(Servo Pattern Demodulation Circuit)

Figure 10:
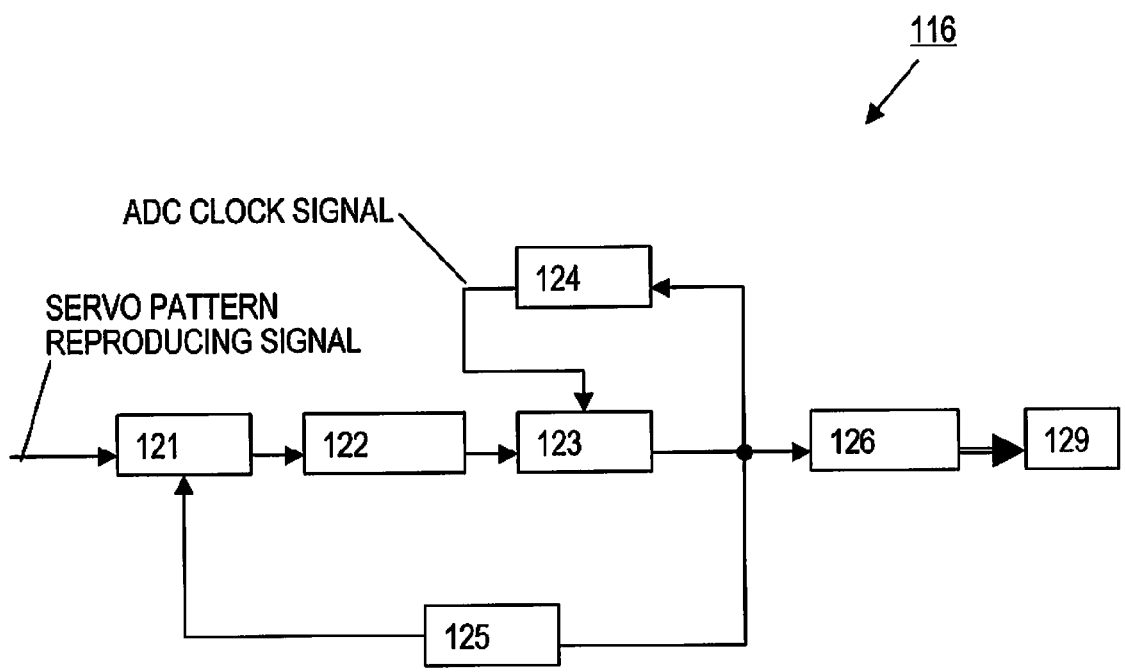
FIG. 10 is a block diagram depicting a read channel in FIG. 1.
Figure 11:
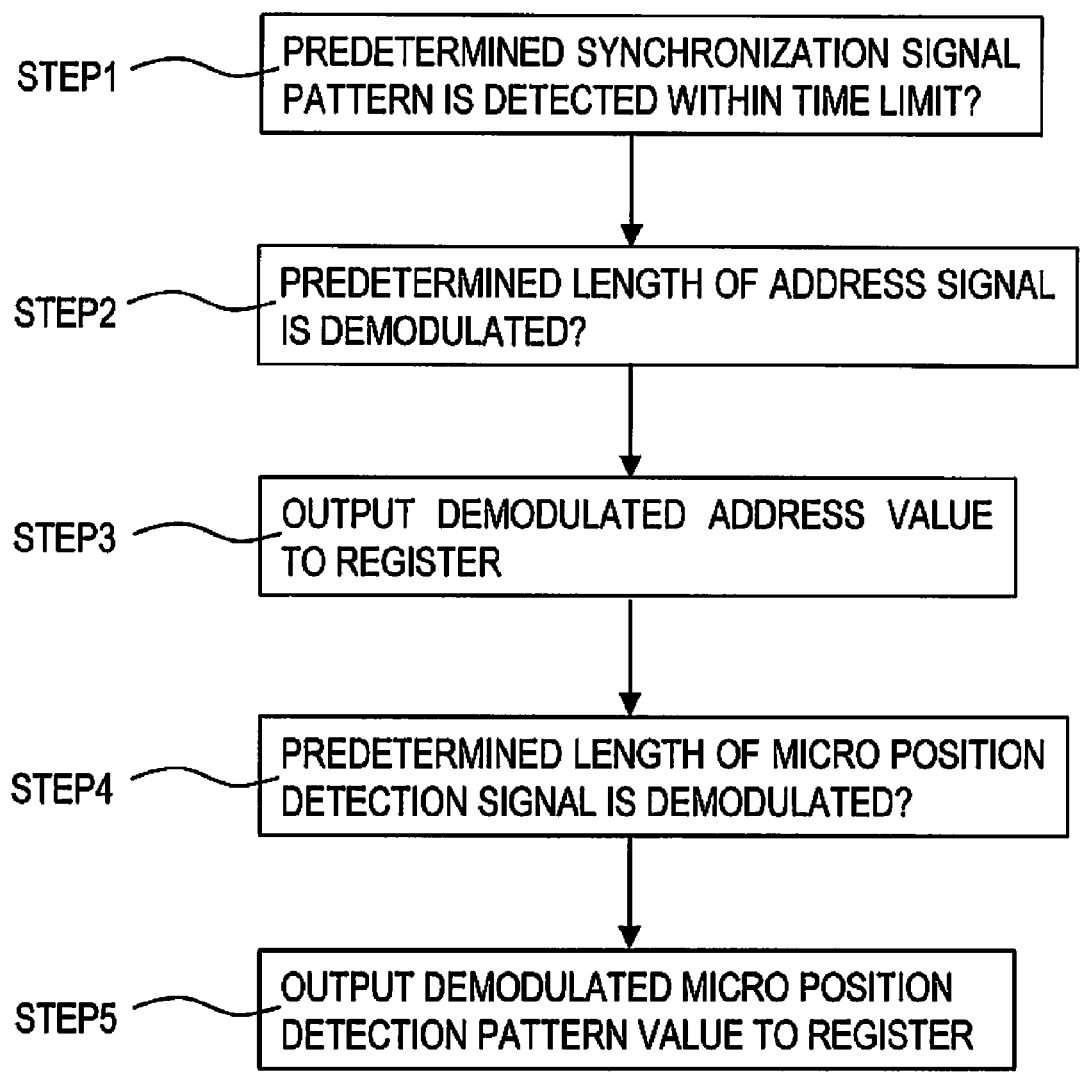
FIG. 11 is a flow chart depicting the operation of the demodulation sequence in FIG. 10.
Figure 12:
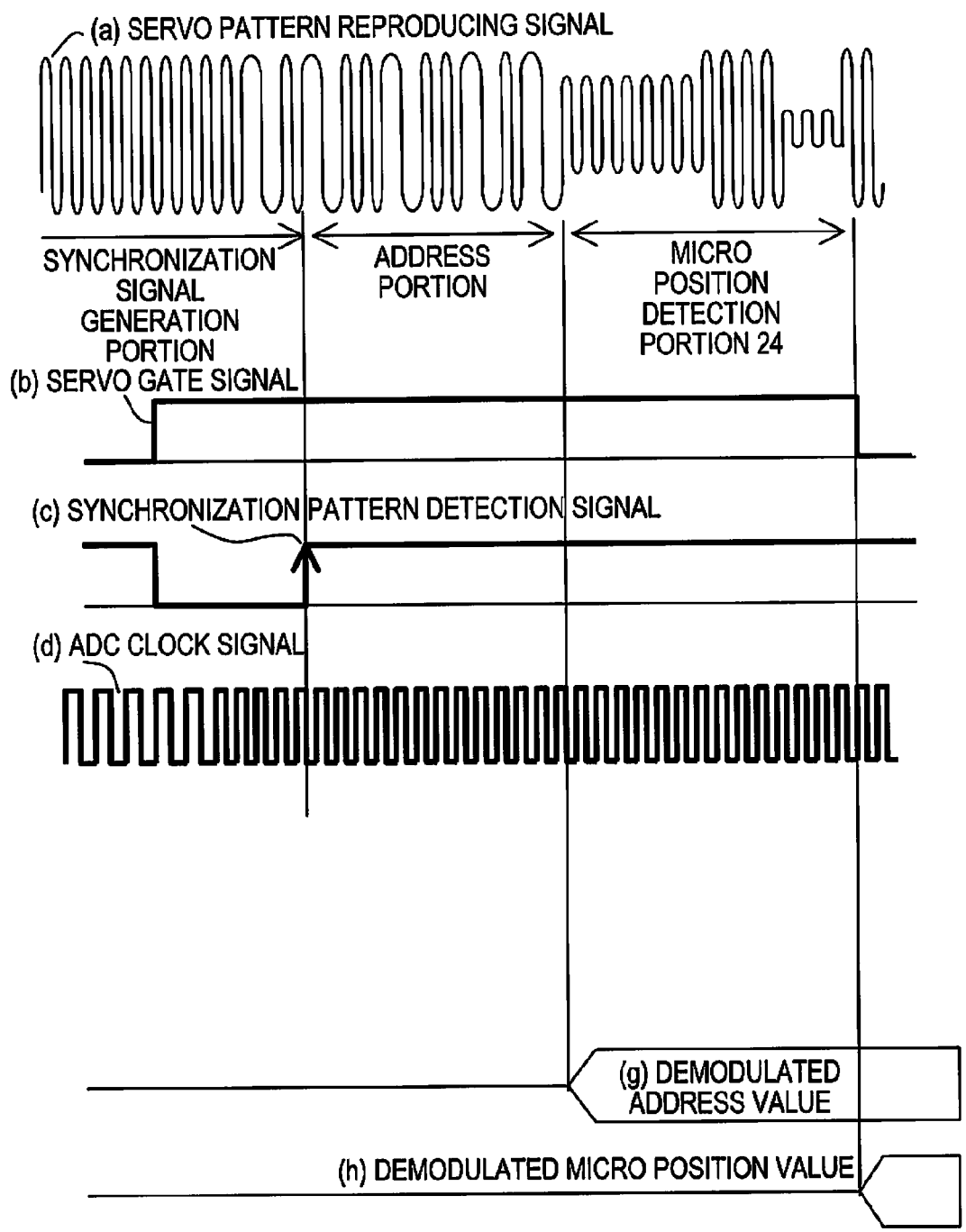
FIG. 12 is a time chart of this demodulation operation in FIG. 10.

FIG. 10 is a block diagram depicting a read channel 116 of the magnetic recording device according to an embodiment of the present invention, FIG. 11 is a flow chart depicting the operation of the demodulation sequencer having the configuration in FIG. 10, and FIG. 12 is a time chart of this demodulation operation. FIG. 10 is a block diagram for reading the servo information on the magnetic disk medium when the MPU performs positioning control of the magnetic head in the read channel 116 in FIG. 1.

Now the configuration in FIG. 10 will be described with reference to FIG. 11 and FIG. 12. In FIG. 10, the servo pattern reproducing signal (a) in FIG. 12 is obtained from the head amplifier 107 (see FIG. 1) with a predetermined time interval by the magnetic disk medium 1 rotating at a predetermined angular velocity.

The servo pattern reproducing signal (a) is amplified by a variable gain amplifier 121 in the read channel 116, then the high frequency noise component is filtered out by a low pass filter 122. Then A/D conversion is performed by an A/D converter 123, and digitized amplification information is obtained. Based on the digitized amplification information, a gain controller 125 adjusts the gain of a variable gain 121 so as to obtain optimum amplitude.

As FIG. 12 shows, a predetermined cyclic pattern is written in the above-mentioned synchronization signal generation portion in the servo pattern introductory portion. A servo gate signal (b) is asserted in advance, so that enough number of synchronization pattern is read by which the output from a phase lock loop (PLL) circuit 124 is converged.

When the servo gate signal (b) is asserted, the PLL circuit 124 synchronizes with the synchronization signal of the synchronization signal generation portion of the servo pattern reproducing signal (PLL is locked). Then the PLL circuit 124 generates an ADC clock signal (d), which is necessary to sample the servo pattern reproducing signal where the address portion and micro position detection portion 24 appears after the synchronization signal, as shown in FIG. 12.

The demodulation sequencer 126 demodulates the A/D converted reproducing signal according to the sequence in FIG. 11, at a timing determined by the ADC clock signal (d).

First, in Step 1, it is judged whether a servo sync mark pattern, which indicates a start of servo information recorded at the end of the synchronization signal generation portion of the servo pattern, and is written by a predetermined length of bits or by a specific code pattern bits, was detected before a predetermined time elapses from the assertion of the servo gate signal (b). And if the servo sync mark is detected, processing moves to Step 2, where demodulation of the address signal is started.

In Step 2, the address signal is demodulated only for a predetermined bit length, and when completed, the result (g) is output to the register 129 in Step 3. In Step 4, demodulation of the micro position detection signal is started only for a predetermined bit length. This demodulation processing will be described later with reference to FIG. 13 and later drawings. In Step 5, the demodulation result (h) is output to the register 129.

By the above operation, the MPU 115 (see FIG. 1) reads the demodulated address value and demodulated micro position value stored in the register 129, and performs computation required for positioning control of the magnetic head, and controls the VCM driver 112.

Figure 13:
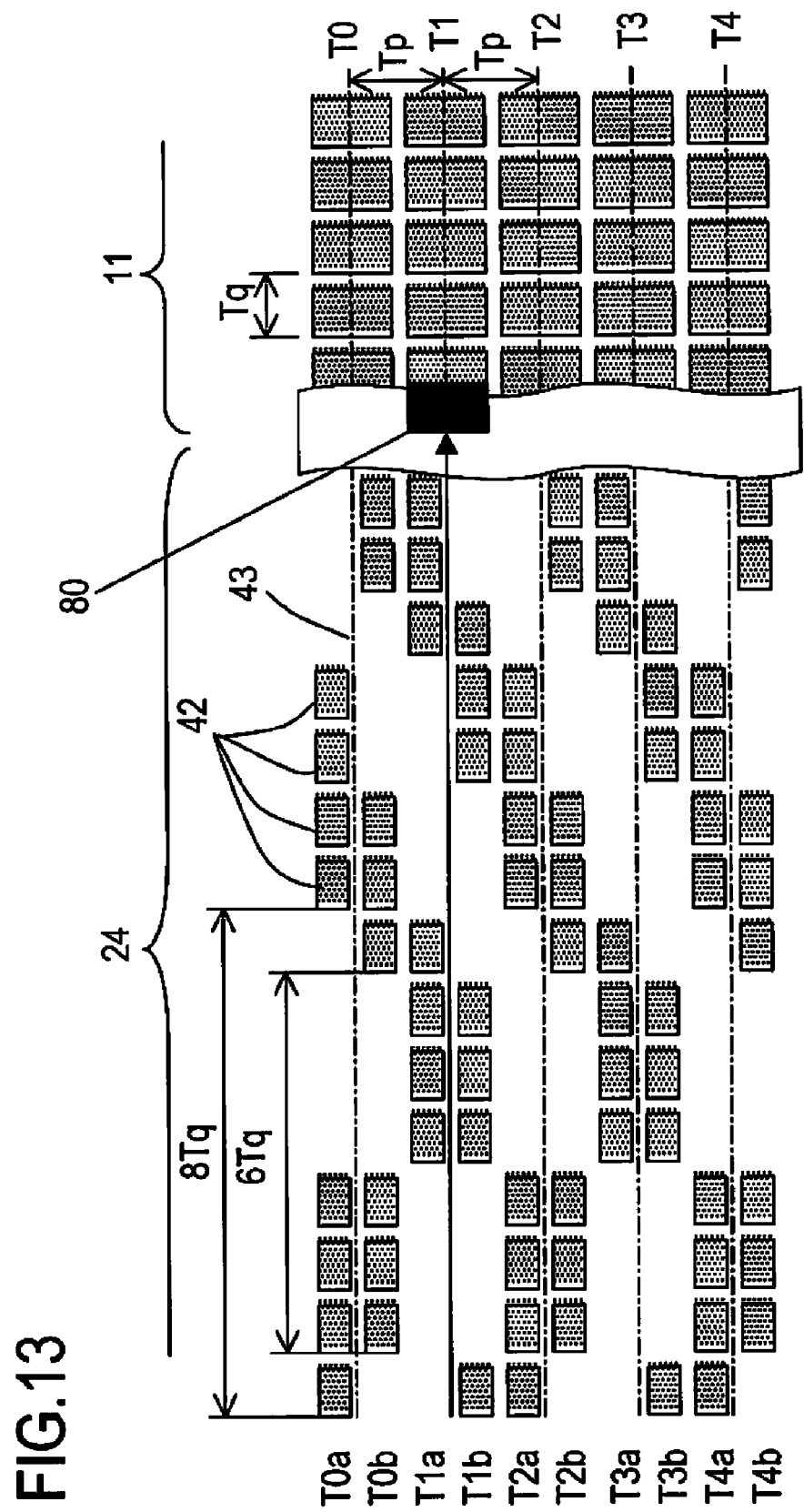
FIG. 13 is an explanatory diagram of the demodulation operation in FIG. 10.
Figure 14:
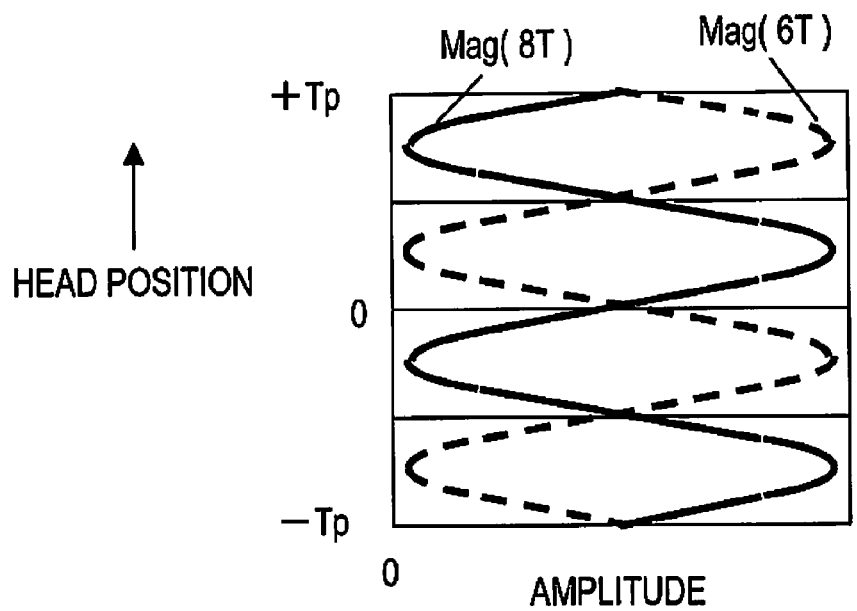
FIG. 14 shows a relationship of offset position of the magnetic head and the demodulated amplitude in FIG. 13.

Now the position demodulation operation by the magnetic dots of the micro position detection unit 24 in FIG. 4 will be described in detail with reference to FIG. 13 to FIG. 16. FIG. 13 is a diagram depicting a state of the magnetic head reproducing element 80 scanning the center of the recording track T1 on the magnetic disk where the second magnetic dots of the present embodiment in FIG. 4 are regularly arrayed, and FIG. 14 is a graph depicting how the components of each 2-cycle 2-phase pattern included in the signal detected by the reproducing element change by the scanning in FIG. 13, depending on the distance from the center of the recording track T1.

As FIG. 13 shows, four magnetic dots 42 are disposed next to each other with an interval eight times that of the interval of the magnetic dots 42 (8 Tq) at a position shifted by (¼) Tp upward from track T1, and the non-magnetic areas 43 are disposed with the same interval.

Three magnetic dots 42 are disposed next to each other with an interval six times that of the interval of the magnetic dots 42 (6 Tq) at a position shifted by (¼) Tp downward from the track T1, and the non-magnetic areas 43 are disposed with a same interval.

Therefore when the reproducing element 80 of the magnetic head 103 scans the parallel line T1a of the track T1, that is, if the line is shifted by (¼) Tp upward (radius direction) from the center of the track T1 in FIG. 13, the amplitude of the 8Tq component included in the reproducing signal becomes the maximum, and the phase becomes negative.

When the reproducing element 80 scans the parallel line T1b of T1, that is, when the line is shifted by (¼) Tp downward from the center of the track T1 in FIG. 13, the amplitude of the 6Tq component included in the reproducing signal becomes the maximum, and the phase becomes negative. In the same way, if the reproducing element 80 is +(¾) Tp shifted, the +6Tq component becomes the maximum, and if −(¾) Tp offset, the +8Tq component becomes the maximum.

Figure 15:
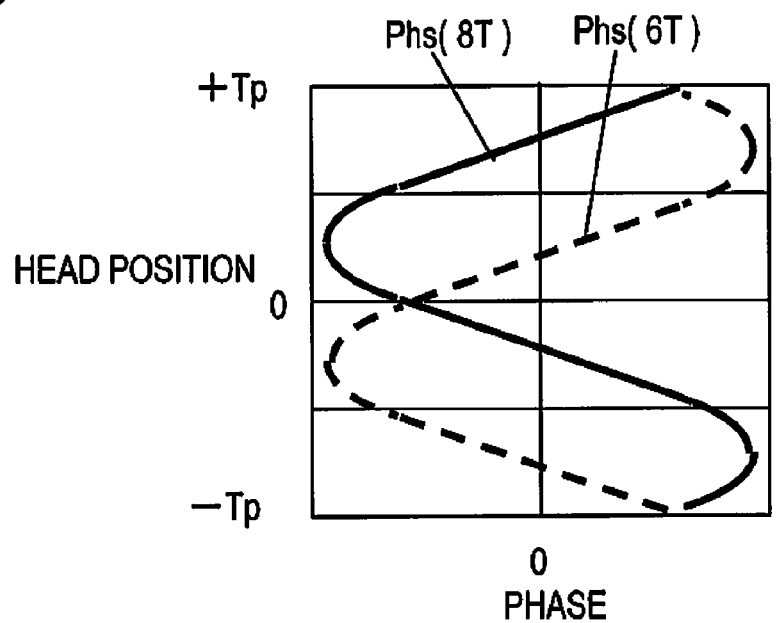
FIG. 15 shows a relationship of offset position of the magnetic head and the demodulated phase.

FIG. 14 shows the head position (offset position) and the amplitude change of the 8Tq component and 6Tq component, and FIG. 15 shows the head position (offset position) and phase change of the 8Tq component and 6Tq component.

When the reproducing element 80 exists near offset 0 in FIG. 13, the phases of the 8Tq pattern and 6Tq pattern components become negative, as shown in FIG. 15. When the reproducing element 80 exists near the offset +(½) Tp, the phase of the 8T pattern components become negative, and the phase of the 6T pattern becomes positive, as shown in FIG. 15.

As FIG. 14 shows, the amplitude of the 8Tq pattern component and the amplitude of the 6Tq pattern component becomes opposite according to the offset position of the reproducing element 80, and form one cycle of a sinusoidal pattern at the offset positions +(½)Tp to (−(½))Tp.

Therefore the difference of each amplitude component is computed using the demodulation logic shown in FIG. 16, so as to demodulate the offset position. In other words, when the reproducing element 80 exists near the offset 0 in FIG. 13, the phases of the 8Tq pattern and the 6Tq pattern become negative, as shown in FIG. 15, so the position signal can be demodulated by determining the difference of the amplitude of the 8Tq pattern component and amplitude of the 6Tq pattern component.

When the reproducing element 80 exists near the offset +(½)Tp, the phase of the 8Tq pattern component becomes negative, and the phase of the 6Tq pattern component becomes positive, so the position signal is obtained by determining the difference of the amplitude of the 8Tq pattern component and the amplitude of the 6Tq pattern component.

According to the above-mentioned demodulation logic, when the phase Phs (8T) of the 8Tq pattern component is positive, (amplitude of 8Tq pattern component Mag (8T)-amplitude of 6Tq pattern component Mag (6T)) is computed if the phase Phs (6T) of the 6Tq pattern component is positive, and (amplitude of 6Tq pattern component Mag (6T)-amplitude of 8Tq pattern component Mag (8T)) is computed if the phase of the 6Tq pattern component is negative.

In the same manner, when the phase Phs (8T) of the 8Tq pattern component is negative, (amplitude of 6Tq pattern component Mag (6T)-amplitude of 8Tq component Mag (8T)) is computed if the phase Phs (6T) of the 6Tq pattern component is positive, and (amplitude of 8Tq pattern component Mag (8T)-amplitude of 6Tq pattern component Mag (6T)) is computed if the phase of the 6Tq pattern component is negative.

Figure 17:
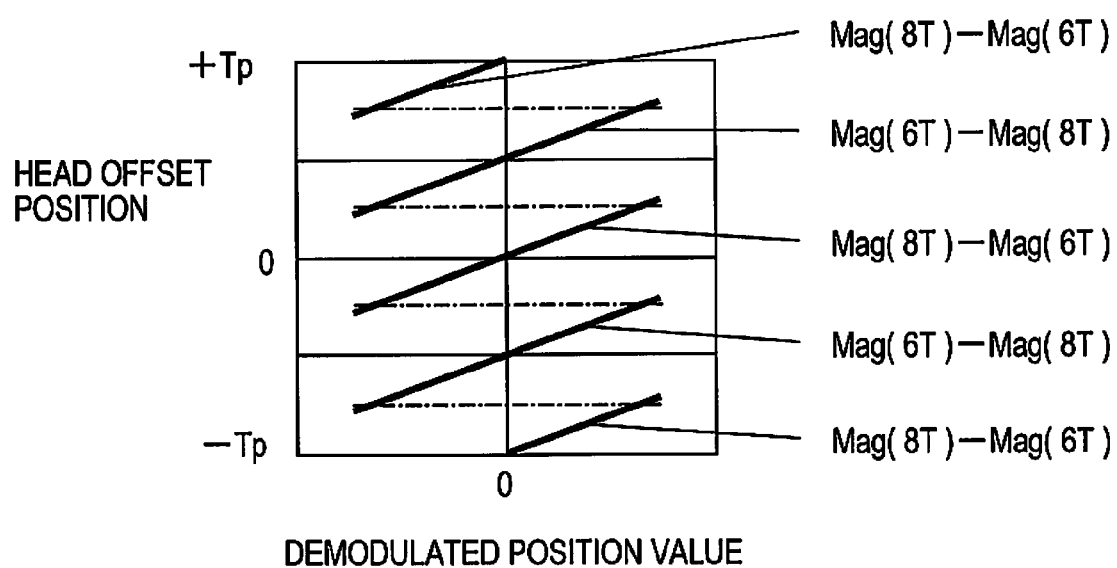
FIG. 17 shows a relationship of the offset position and the demodulated position of the magnetic head shown in FIG. 16.

FIG. 17 shows a relationship of the positive signal demodulated using the demodulation logic in FIG. 16 and the offset position of the reproducing element 80. In other words, the demodulated position present a linear form in (½) Tp units. In this way, a linear position signal can be obtained no matter where the reproducing element 80 is located.

In the micro position detection portion of the servo pattern reproducing signal in FIG. 12, a 4-phase signal is reproduced in the case of a prior art, while a signal comprised of two frequency components is reproduced in the case of the present embodiment. The rest of the operations of the present embodiment are the same as the prior art.

In this way, the micro position detection portion is constructed with a different number of magnetic dots in the circumference direction, with the center line where the magnetic dots of the data area are disposed as an axis, so the position can be demodulated accurately from the reproducing signal, even if the area of the magnetic dots in the micro position detection portion is small. Also because the area of a magnetic dot constituting the micro position detection portion of the servo area is small, the coercive force of the servo area increases, which is excellent in terms of reliability of the reproducing signal of the servo area, and can improve the reliability of recording/reproducing of the data area.

Also the frequency is changed depending on the number of magnetic dots, and the phase is changed depending on the position of the magnetic dot array in the radius direction, with the center line as an axis, so the shift amount of the head position can be easily demodulated from the reproducing signal of the head.

Second Embodiment of a Magnetic Storage Medium

Figure 18:
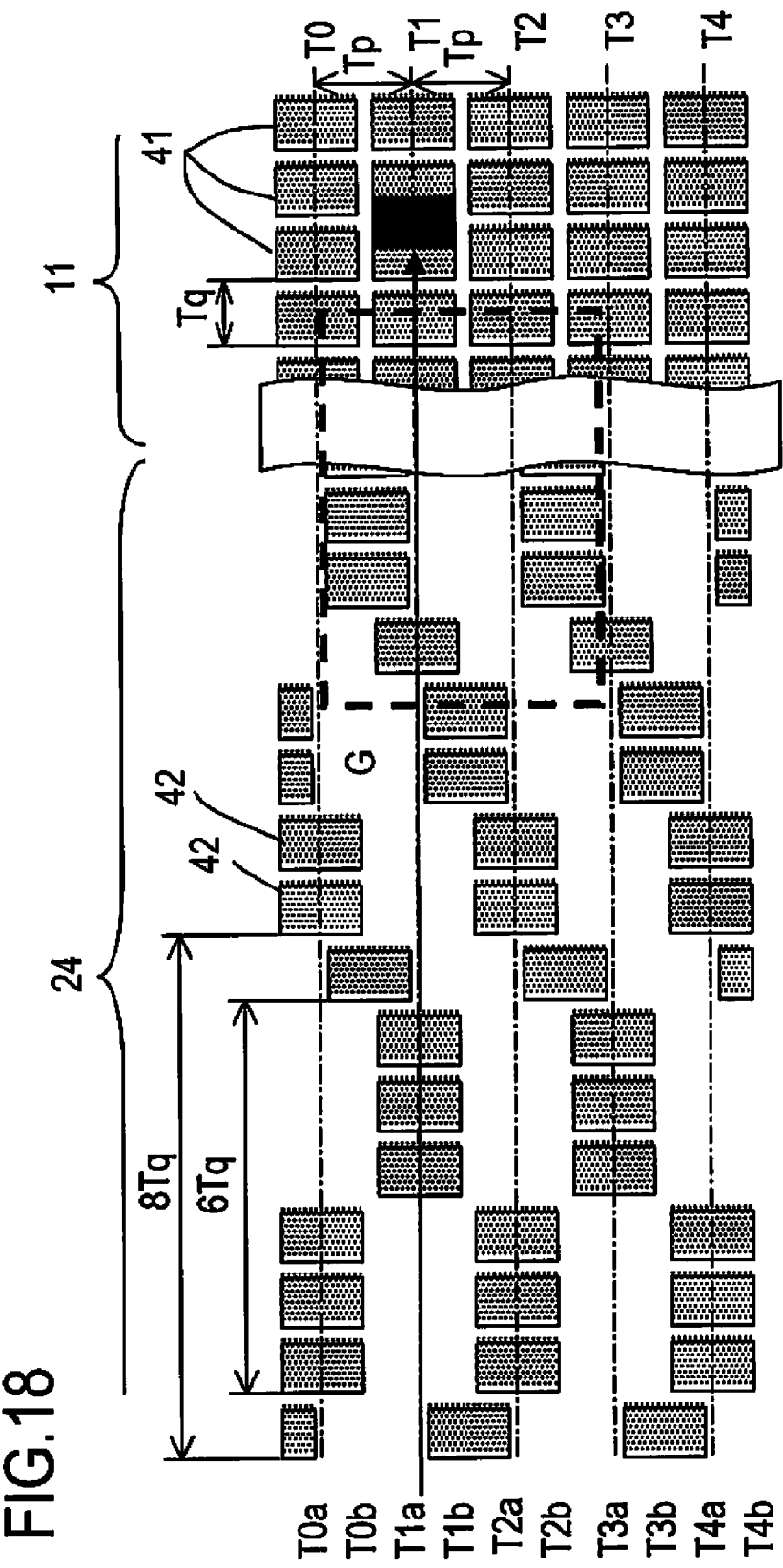
FIG. 18 is a block diagram of the magnetic storage medium of the second embodiment of the present invention.
Figure 19:
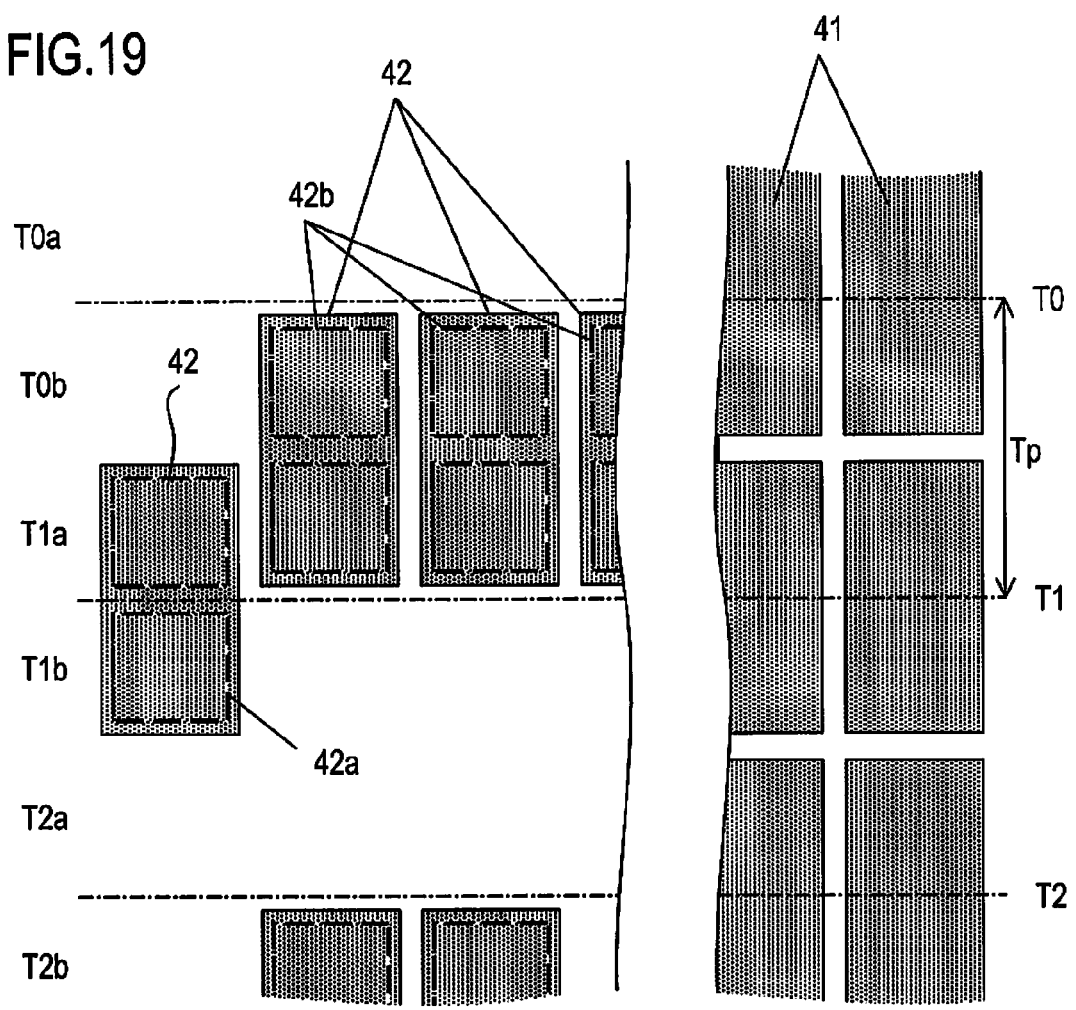
FIG. 19 is an enlarged view of portion in FIG. 18.

FIG. 18 is a diagram depicting the servo area and data area of the magnetic recording medium of the second embodiment of the present invention. FIG. 19 is an enlarged view of portion G in FIG. 18.

The second embodiment will now be described in comparison with FIG. 4, which depicts the first embodiment. In the case of the above-mentioned first embodiment, the second magnetic dot array having a cycle of 6Tq and a second magnetic dot array having a cycle of 8Tq are alternately disposed while reversing the phase, in the micro position detection portion 24 of the servo area.

Whereas in the case of the second embodiment in FIG. 18, a magnetic dot 42 which has a size roughly the same as the first magnetic dot 41 in the data area 11 is constructed by joining the second magnetic dots which adjoin in the radius direction.

In concrete terms, in the case of the second magnetic dot array in cycle 8Tq disposed on the track parallel line T1a in FIG. 4, there are areas where the magnetic substance is adjacent to the second magnetic dot array in cycle 6Tq disposed on the adjacent track parallel line T1b below the track parallel line T1a in FIG. 4, and there are area where the magnetic substance is not adjacent to the magnetic substance of the track parallel line T1b.

According to the present embodiment, in an adjoining area, the magnetic dot is joined with the second magnetic dot disposed on the track parallel line T1b, as shown in FIG. 18. In a non-adjoining area, being adjacent to the second magnetic dot array in the cycle 6Tq disposed on the track parallel line T0b, which is adjacent above the track parallel line T1a, is determined, so according to this, the magnetic dot is joined with the second magnetic dot disposed on the track parallel line T0b.

This will be described in details with reference to FIG. 19, which is an enlarged view of portion G enclosed by the broken line in FIG. 18. In FIG. 19, a size indicated by the broken line is a size of the second magnetic dot 42 according to the first embodiment, in the second magnetic dot 42 of which size is roughly the same as the first magnetic dot 41.

According to the first embodiment, the second magnetic dot in the cycle 8Tq is disposed on the track parallel line T1a, as indicated by the broken line. In the case of the present embodiment, if the second magnetic dot 42a exists on the track parallel line T1b, which is adjacent below the track parallel line T1a, the above second magnetic dot joins with this and is disposed as a new second magnetic dot 42 having the same size as the first magnetic dot 41 in the data area.

When the second magnetic dot does not exist on the track parallel line T1b which is adjacent to the track parallel line T1a, the second magnetic dot 42b always exists on the adjacent track parallel line T0b which is adjacent above the track parallel line T1a. Therefore the above second magnetic dot joins with the second magnetic dot 42a on the track parallel line T0b, and is disposed as a new second magnetic dot 42 having the same size as the first magnetic dot 41 in the data area.

In the case of this configuration, the second magnetic dot 42 can be roughly the same size as the first magnetic dot 41, so the second magnetic dot 42 can be formed under the same conditions as the magnetic substance designed for the first magnetic dot and manufacturing process thereof.

Third Embodiment of a Magnetic Storage Medium

Figure 20:
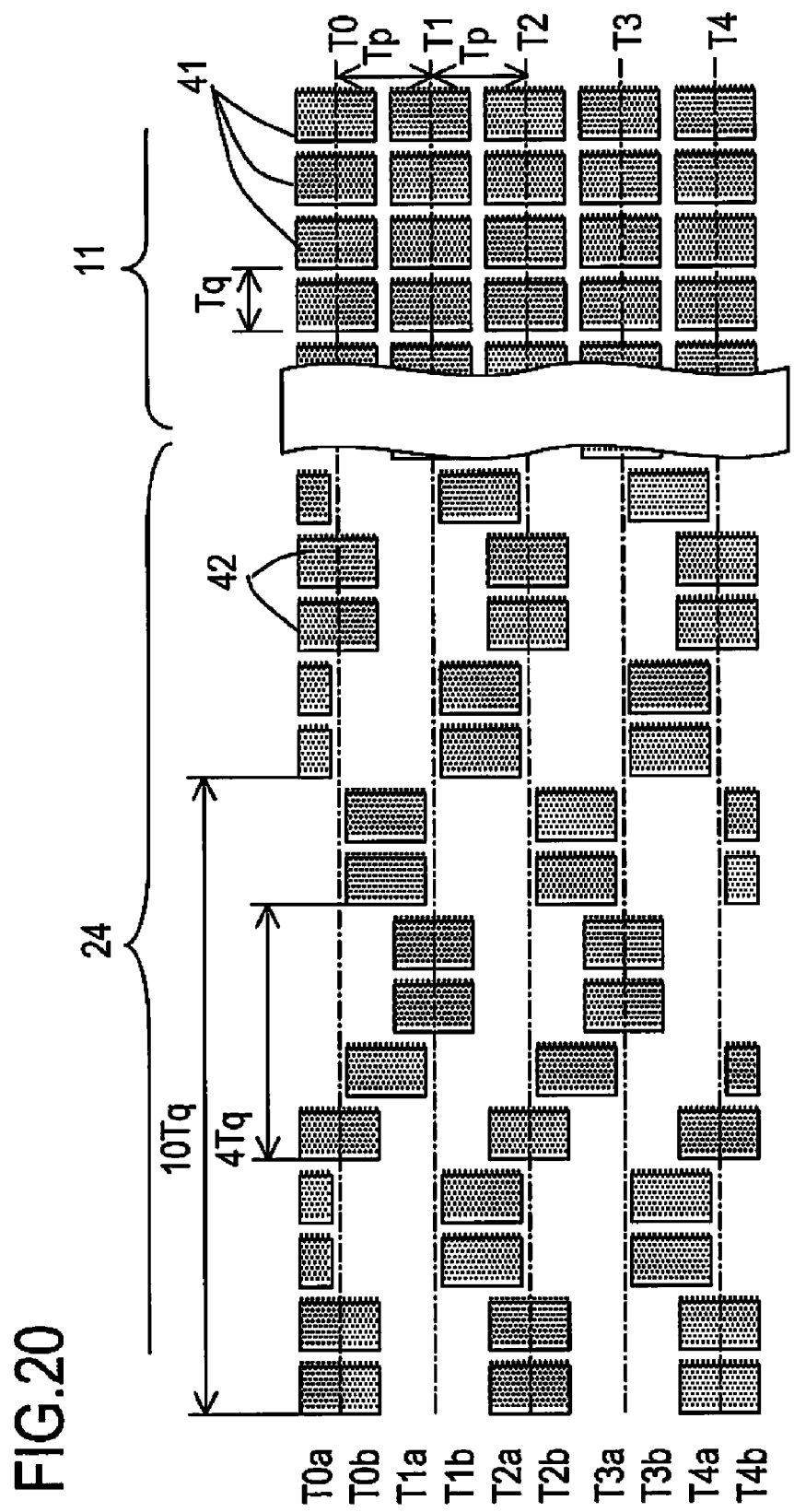
FIG. 20 is a block diagram of the magnetic storage medium of the third embodiment of the present invention.

FIG. 20 is a diagram depicting the servo area and data area of the magnetic storage medium according to the third embodiment of the present invention.

In the first and second embodiments, the micro position detection portion 24 of the servo area is comprised of second magnetic dot arrays in the cycle 8Tq and cycle 6Tq, which are disposed alternately on the track parallel lines T0a, T0b, T1a, T1b, . . . at a ½ pitch of the pitch Tp of recording tracks T0, T1, T2 . . . comprised of the first magnetic dots 41, in the data area.

However, the micro position detection portion 24 may be constructed by second magnetic dot arrays in different cycles. As FIG. 20 shows, the micro position detection portion 24 of the servo area is constructed using a second magnetic dot array in cycle 10Tq and second magnetic dot array in cycle 4Tq. In other words, five second magnetic dots continue at a position T1a, which is (½) Tp pitch away from the center axis of the track T1, and the second magnetic dot array in the cycle 10Tq, where a non-magnetic area having a same length continues, is disposed.

Two second magnetic dots continue at a position T1b which is (−½) Tp pitch away from the center axis of the track T1, and second magnetic dot array in the cycle 4Tq, where a non-magnetic area having a same length continues, is disposed.

In this way as well, the frequency can be changed by the number of dots, and phase can be changed by the position, and the head position can be demodulated.

(Manufacturing Method for a Magnetic Storage Medium)

Figure 21:
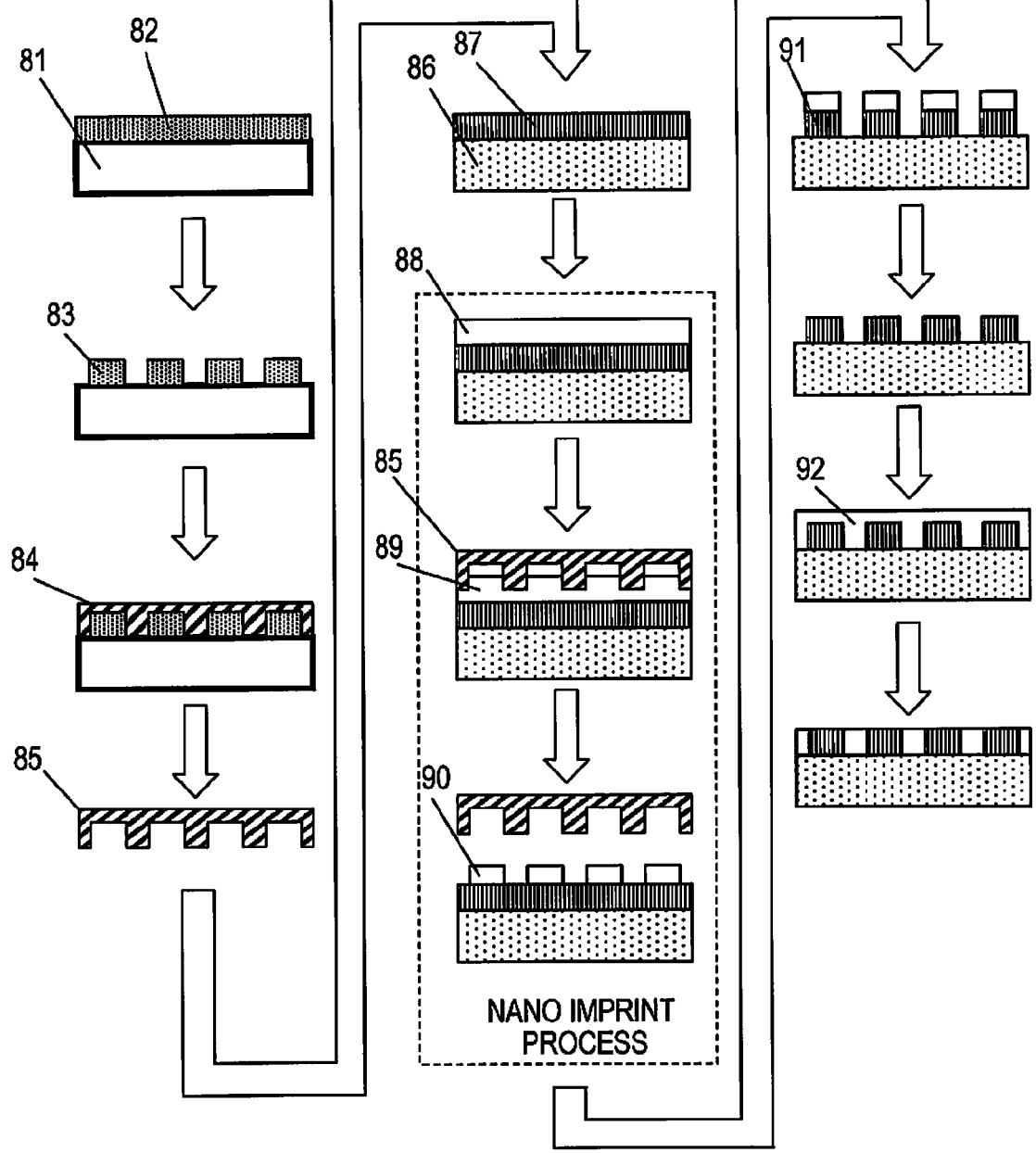
FIG. 21 is an explanatory diagram depicting a manufacturing method of the magnetic storage medium according to the present invention.
Figure 22:
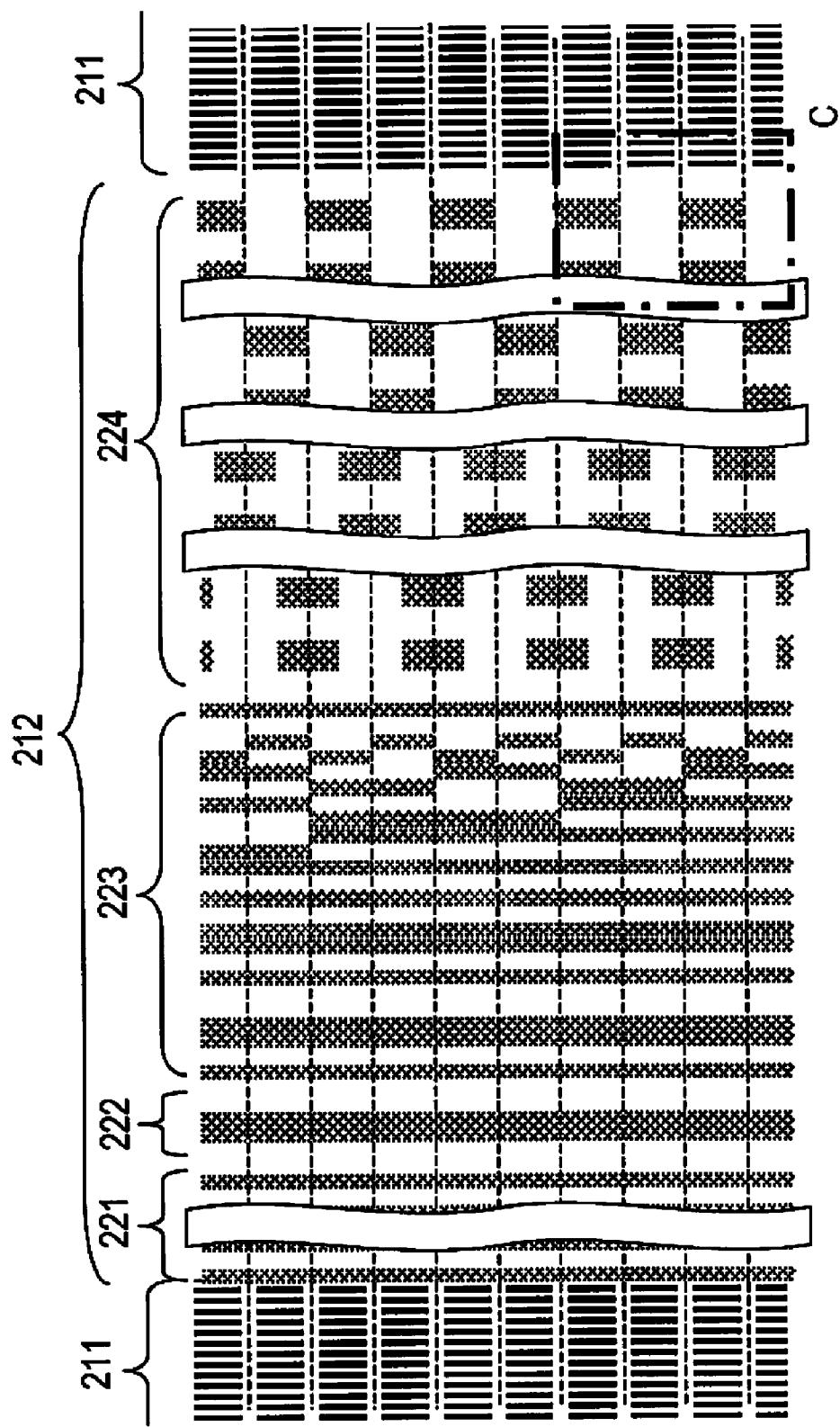
FIG. 22 is a block diagram of a conventional patterned media type magnetic storage medium.

A manufacturing method for the magnetic storage medium of the present embodiment is not especially restricted, but the magnetic storage medium created by the manufacturing method shown in FIG. 21 is desirable, since it is easy to form a pattern of magnetic substance in a desired shape accurately.

When a patterned media type magnetic disk medium is manufactured, nano-imprint lithography is normally used. FIG. 21 is a diagram depicting an example of a magnetic disk medium manufacturing steps using nano-imprint lithography. The medium manufacturing process using this means includes the following steps.

For example, a stamper for nano-imprinting is formed via steps (1) to (4). In other words, (1) a resist 82 is coated on a silicon substrate 81 by a spin coat method. (2) The resist 82 is patterned by electron beam exposure and development, and a patterned resist 83 is obtained. (3) Plating processing is performed on the resist 83, and plated portion 84 is formed. (4) The plated portion 84 is stripped from the patterned resist 83, and the stamper for nano-imprinting 85 is obtained.

Then the magnetic storage medium is created via steps (5) to (12). In other words, (5) layers 87, which are normally formed on the magnetic storage medium, such as a magnetic layer, are deposited on the glass substrate 86. (6) Thermoplastic resin 88 having resistance to etching, which is performed in (9), is coated on the magnetic layer 87. (7) The stamper 85 obtained in (4) is pressurized onto the thermoplastic resin 88 while heating, and a deformed resin layer 89 is created. (8) The stamper 85 is stripped, and the patterned resin layer 90 remains. (9) Out of the magnetic layer, a portion of uncovered resin layer 90 is etched, and a patterned magnetic layer 91 is formed. (10) The resin layer 90 on the patterned magnetic layer 91 is removed. (11) A non-magnetic substance 92 is filled on the patterned magnetic layer 91. (12) The surface of the non-magnetic substance 92 is planarized, and the magnetic storage medium where the magnetic substance 91 and non-magnetic substance 92 are exposed is obtained.

By the above method, the manufacturer can dispose the magnetic substance on the magnetic disk substrate at any position and size, and can manufacture a patterned media type magnetic disk. In (6), when UV curable resin is used instead of thermo-plastic resin, a known UV imprint can be used in (7).

In the case of patterned media, a data recording track is formed at a predetermined position of the medium, so the servo pattern must also be formed so as to match this position. A general trend of the patterned media is to create a stamper where a servo pattern is also created together with a data pattern.

However in the magnetic storage medium of the above embodiments, the magnetic substance of the data area and the magnetic substance of the servo area may be formed by different manufacturing methods if necessary.

Other Embodiments

The above embodiments were described using a combination of magnetic dot arrays in 8Tq and 6Tq, and a combination of magnetic dot arrays in 10Tq and 4Tq, but a combination of different numbers of dot arrays in different phases may be used.

As described above, the technical scope of the present invention is not limited to the above-described embodiments. The preferred embodiments described above are therefore illustrative and not restrictive, the scope of the invention being indicated by the appended claims and all variations with come within the meaning of the claims are intended to be embraced therein.

Since the micro position detection portion is constructed with a different number of magnetic dots in the circumference direction with the center line, where the magnetic dots of the data area are disposed, as the axis, the position can be demodulated accurately from the reproducing signal, even if the area of the magnetic dot of the micro-position detection portion is small. Also because the area of the magnetic dot constituting the micro position detection portion of the servo area is small, the coercive force of the servo area increases, which is excellent in terms of reliability of the reproducing signal of the servo area, and can improve reliability of recording/reproducing of the data area. Since the frequency is changed depending on the number of magnetic dots, and the phase is changed depending on the position of the magnetic dot array in the radius direction with the center line as an axis, the shift amount of the head position can be easily demodulated from the reproducing signal of the head.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A magnetic storage medium, comprising:
a data area having a track in which a plurality of isolated first magnetic dots are disposed at predetermined positions for recording information; and
a servo area which specifies the positions of the first magnetic dots and has a micro position detection portion, wherein said micro position detection portion comprises:
a first magnetic dot array in which a first number of isolated second magnetic dots are arrayed in a first cycle; and
a second magnetic dot array in which a second number of second magnetic dots different from the first number of the second magnetic dots in the first magnetic dot array are arrayed in a second cycle, and
a center line of a track, in which the first magnetic dots are disposed, is located as an axis between said first magnetic dot array and said second magnetic dot array facing each other.

2. The magnetic storage medium according to claim 1, wherein the magnetic storage medium is a disk type,
and the servo area is disposed intermittently on a strip of circumference of which center is a center of the magnetic storage medium, and the data area is disposed in a portion on the strip of circumference, where the servo area is not disposed.

3. The magnetic storage medium according to claim 1, wherein
the first magnetic dot array has a continuous non-magnetic area in which the first number of the second magnetic dots are disposed continuously and of which length is a length of the first number of second magnetic dots, and
the second magnetic dot array has a non-magnetic area in which the second number of the second magnetic dots are disposed continuously and of which length is a length of the second number of second magnetic dots.

4. The magnetic storage medium according to claim 1, wherein the first magnetic dot array and the second magnetic dot array are disposed at positions shifted in the circumference direction of the magnetic storage medium.

5. The magnetic storage medium according to claim 1, wherein the second magnetic dots each have size which does not exceed a size of each of the first magnetic dots.

6. The magnetic storage medium according to claim 1, wherein a second magnetic dot in the first magnetic dot array is joined with a second magnetic dot in the second magnetic dot array which exists at a same position in the radius direction of the magnetic storage medium.

7. A magnetic recording device, comprising:
a magnetic storage medium comprising:
a data area having a track in which a plurality of isolated first magnetic dots are disposed at predetermined positions for recording information; and
a servo area which specifies the positions of the first magnetic dots and has a micro position detection portion comprising a first magnetic dot array in which a first number of isolated second magnetic dots are arrayed in a first cycle, and a second magnetic dot array in which a different number of second magnetic dots from that of the second magnetic dots in the first magnetic dot array are arrayed in a second cycle, center line of the track, in which the first magnetic dots are disposed, being located as an axis between said first magnetic dot array and said second magnetic dot array facing each other;
a magnetic head which records magnetic information to the magnetic storage medium or reproduces magnetic information on the magnetic storage medium; and
a control circuit which extracts the amplitude and phase of two different types of cyclic components from a magnetic reproducing signal of the micro position detection portion of the servo area, detected by the magnetic head, and specifies the position of the magnetic head with respect to the first magnetic dots.

8. The magnetic recording device according to claim 7, wherein the magnetic storage medium is a disk type,
and the servo area is disposed intermittently on a strip of circumference of which center is the center of the magnetic storage medium,
and the data area is disposed in a portion on the strip of circumference, where the servo area is not disposed.

9. The magnetic recording device according to claim 7, wherein
the first magnetic dot array has a continuous non-magnetic area in which the first number of the second magnetic dots are disposed continuously and of which length is a length of the first number of second magnetic dots, and
the second magnetic dot array has a non-magnetic area in which the second number of the second magnetic dots are disposed continuously and of which length is a length of the second number of second magnetic dots.

10. The magnetic recording device according to claim 7, wherein the first magnetic dot array and the second magnetic dot array are disposed at positions shifted in the circumference direction of the magnetic storage medium.

11. The magnetic recording device according to claim 7, wherein the second magnetic dot has an area which does not exceed an area of the first magnetic dot.

12. The magnetic recording device according to claim 7, wherein a second magnetic dot in the first magnetic dot array is joined with a second magnetic dot in the second magnetic dot array which exists at a same position in the radius direction of the magnetic storage medium.

13. The magnetic recording device according to claim 7, wherein the control circuit extracts amplitude of a frequency component based on a cycle of the first magnetic dot array and amplitude of a frequency component based on a cycle of the second magnetic dot array from a reproducing signal and specifies a position of the magnetic head by a difference in the amplitude between the first magnetic dot array and the second magnetic dot array.

* * * * *